US010985498B2

(12) United States Patent
Sobel et al.

(10) Patent No.: US 10,985,498 B2
(45) Date of Patent: *Apr. 20, 2021

(54) FRAMING ASSEMBLY WITH MODULAR CONNECTORS

(71) Applicant: Hyperframe Inc., San Francisco, CA (US)

(72) Inventors: Kenneth Sobel, San Francisco, CA (US); Jay Cady, South San Francisco, CA (US)

(73) Assignee: Hyperframe Inc., Richmond, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/855,086

(22) Filed: Apr. 22, 2020

(65) Prior Publication Data

US 2020/0251854 A1 Aug. 6, 2020

Related U.S. Application Data

(63) Continuation of application No. 16/536,263, filed on Aug. 8, 2019, now Pat. No. 10,665,988.

(60) Provisional application No. 62/801,487, filed on Feb. 5, 2019, provisional application No. 62/715,954, filed on Aug. 8, 2018.

(51) Int. Cl.
*H01R 13/502* (2006.01)
*H01R 13/627* (2006.01)
*H01R 13/426* (2006.01)

(52) U.S. Cl.
CPC ....... *H01R 13/6271* (2013.01); *H01R 13/426* (2013.01)

(58) Field of Classification Search
CPC .................. H01R 13/426; H01R 13/6271

USPC .......................................................... 439/701
See application file for complete search history.

(56) References Cited

U.S. PATENT DOCUMENTS

| 3,715,627 | A | * | 2/1973 | D'Ausilio | H01R 25/162 361/643 |
| 3,871,730 | A | * | 3/1975 | Hesse | H01R 25/145 439/115 |
| 4,045,109 | A | * | 8/1977 | Langenbach | H01R 13/629 439/261 |
| 4,256,357 | A | * | 3/1981 | Vasseur | H01R 25/14 439/115 |
| 5,031,310 | A | * | 7/1991 | McLean | H01R 43/20 29/831 |
| 5,044,984 | A | * | 9/1991 | Mosser | H01R 12/716 439/541.5 |
| 5,080,609 | A | * | 1/1992 | Fabian | H05K 7/1447 439/541.5 |

(Continued)

FOREIGN PATENT DOCUMENTS

| CN | 106760634 | 5/2017 |
| KR | 10-1149602 | 5/2012 |
| WO | 2005-106146 | 11/2005 |

OTHER PUBLICATIONS

International Search Report and Written Opinion from the International Searching Authority, dated Nov. 20, 2019, 10 pages, for the corresponding PCT Application No. PCT/US2019/045809.

*Primary Examiner* — Abdullah A Riyami
*Assistant Examiner* — Vladimir Imas
(74) *Attorney, Agent, or Firm* — Polsinelli PC

(57) ABSTRACT

Embodiments of a framing assembly including modular connectors for interconnecting components of the framing assembly are disclosed.

22 Claims, 26 Drawing Sheets

(56) References Cited

U.S. PATENT DOCUMENTS

| | | | | |
|---|---|---|---|---|
| 5,096,429 | A * | 3/1992 | Fraser | F21S 2/00 439/115 |
| 5,336,097 | A * | 8/1994 | Williamson, Jr. | H02G 3/288 439/110 |
| 5,348,485 | A * | 9/1994 | Briechle | H01R 25/14 439/110 |
| 5,695,362 | A * | 12/1997 | Hillbish | H01R 13/65802 439/541.5 |
| 5,713,754 | A * | 2/1998 | Samejima | H01R 13/6315 439/374 |
| 5,779,504 | A * | 7/1998 | Dominiak | H04Q 1/146 439/709 |
| 6,200,161 | B1 * | 3/2001 | McClinton | H01R 27/02 439/541.5 |
| 6,343,942 | B1 * | 2/2002 | Okamoto | H01R 25/142 439/110 |
| 6,364,698 | B1 * | 4/2002 | Tsai | H01R 13/658 439/541.5 |
| 6,556,411 | B1 * | 4/2003 | Hoeft | H01R 9/2441 361/119 |
| 6,811,430 | B1 * | 11/2004 | Carrico | H01R 4/2433 439/409 |
| 6,814,631 | B2 * | 11/2004 | Baum | H01R 11/22 439/856 |
| 7,303,446 | B2 * | 12/2007 | Hills | H01R 13/518 439/715 |
| 7,335,049 | B2 * | 2/2008 | Alarcon | H01R 4/2433 439/404 |
| 7,601,013 | B2 * | 10/2009 | Wagener | H02B 1/21 439/110 |
| 7,674,123 | B1 * | 3/2010 | Weber | H02G 3/00 248/316.5 |
| 7,905,750 | B2 * | 3/2011 | Mo | H01R 13/6658 439/541.5 |
| 8,147,257 | B2 * | 4/2012 | Bury | H02G 5/025 439/110 |
| 8,616,902 | B2 * | 12/2013 | Li | H05K 7/1492 439/110 |
| 8,664,542 | B1 * | 3/2014 | Gretz | H02G 3/14 174/480 |
| 8,772,649 | B1 * | 7/2014 | Gretz | H02G 3/14 174/480 |
| 8,979,597 | B2 * | 3/2015 | Starke | H01R 43/24 439/701 |
| 9,420,715 | B2 * | 8/2016 | Vasilevsky | H05K 7/1492 |
| 9,831,642 | B2 * | 11/2017 | Woodley | A47F 11/10 |
| 2002/0020140 | A1 | 2/2002 | Sucre F. | |
| 2004/0123548 | A1 * | 7/2004 | Gimpel | E04B 1/6179 52/582.1 |
| 2004/0219815 | A1 * | 11/2004 | Thompson | H01R 13/5216 439/276 |
| 2011/0304958 | A1 * | 12/2011 | Dozier | H02B 1/32 361/634 |
| 2013/0058028 | A1 * | 3/2013 | Lu | G06F 1/181 361/679.31 |

\* cited by examiner

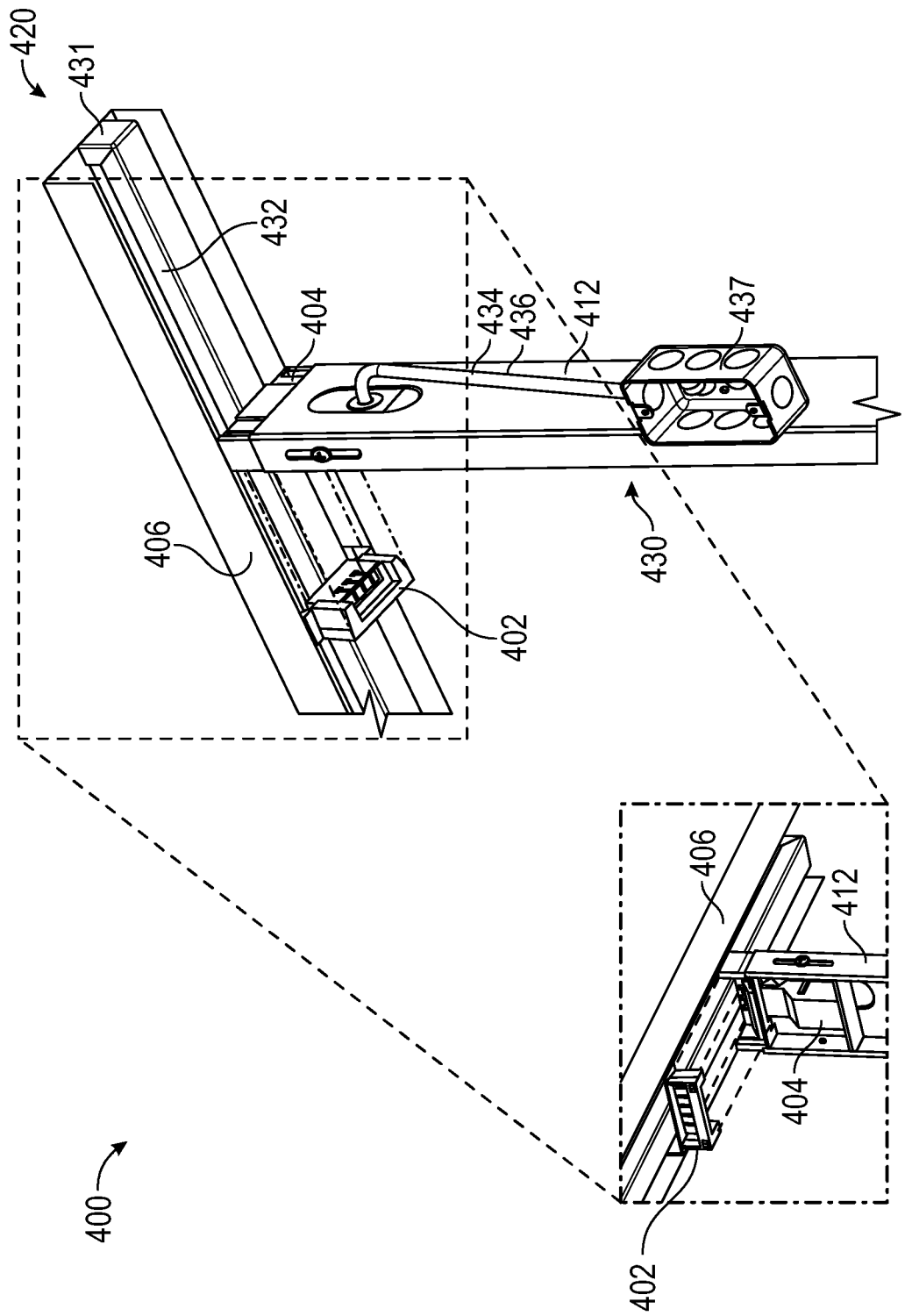

FRAMING ASSEMBLY WITH MODULAR CONNECTORS

CROSS REFERENCE TO RELATED APPLICATIONS

This is a U.S. non-provisional patent application that claims benefit to U.S. provisional patent application Ser. No. 62/715,954 filed on Aug. 8, 2018; U.S. provisional patent application Ser. No. 62/801,487 filed on Feb. 5, 2019; and U.S. non-provisional patent application Ser. No. 16/536,263, each of which is incorporated by reference in entirety.

FIELD

The present disclosure generally relates to construction framing; and in particular, relates to framing assemblies, systems, and/or methods of forming a framing assembly using modular connectors configured for snap-fit connections which may have integrated electrical components for, e.g., power distribution.

BACKGROUND

Traditional methods for constructing residential and commercial buildings remain, for the most part, unchanged. During construction of a building, it is common to frame walls using light gauge steel framing components. Most metal frame walls are built on-site by skilled carpenters and installation involves a labor-intensive process. For rough framing projects in the United States, it is common for labor costs to exceed three times the material cost. In addition, labor costs may increase with a reduction in workforce availability.

In a standard configuration, frame assemblies such as metal frame walls include "tracks" and "studs" (or "joists") which may be fastened together to form a wall frame. In general, a pair of tracks may be horizontally aligned in parallel along opposite ends of the wall, and studs may be positioned vertically between the tracks, typically at regular intervals (e.g., 16-inches on center). Each of the studs may then be manually secured to the tracks by engaging fasteners through the flanges of the tracks and the stud. Other joining methods may be used, such as welding and riveting. This process generally forms the supporting structure of the wall frame.

Connecting the studs with the tracks at the job site or during manufacturing presents various technical challenges. For example, it is generally critical to fasten the studs to the tracks using a fastening process that is capable of limiting lateral movement of the studs relative to the corresponding tracks so as to protect the integrity of the wall during building movement caused by expansion and contraction, wind forces, and seismic events. In addition, the fastening process must be cost and labor efficient. In some cases, this fastening process may be achieved using specialized tracks such as a deflection track that contains vertical slots spaced at regular intervals (e.g. one-inch on center). In this case, the studs may be secured to the deflection track by fastening screws through the closest slot of the deflection track and into the flange of the stud. Other specialized tracks may include cross-sectional modifications to the track profile so that the studs can be engaged along predetermined positions of the track. However, investment in such specialized tracks may complicate the overall framing process and/or lead to excess cost. On the other hand, studs and tracks widely available in the marketplace and/or commonly deployed for installation are shipped in large bundles of "raw" material and have standard dimensions and shape configurations (e.g., U-shaped or C-shaped); yet, a cost-efficient and mechanically sound fastening process for these widely available components is lacking. Moreover, such conventional tracks and studs lack sufficient features for accommodating the deployment of building utilities such as electrical, plumbing, HVAC, and the like.

It is with these observations in mind, among others, that various aspects of the present disclosure were conceived and developed.

BRIEF DESCRIPTION OF THE DRAWINGS

FIG. 9A is a perspective view illustrating a portion of another embodiment of a framing assembly which may be configured for electromechanical connections using another embodiment of a first connector and another embodiment of a second connector described herein.

FIG. 9B is a perspective view illustrating the framing assembly embodiment of FIG. 9A from a different angle.

Corresponding reference characters indicate corresponding elements among the view of the drawings. The headings used in the figures do not limit the scope of the claims.

DETAILED DESCRIPTION

Overview:

Aspects of the present disclosure relate to a framing assembly formed using a plurality of modular connectors. The framing assembly may be implemented as part of a structural or load-bearing frame, such as a wall frame (or non-structural or non-load bearing frame), leveraging snap-fit connections between the modular connectors that e.g., may facilitate engagement of studs to a track. In addition, embodiments of the wall frame system may include integrated utility services (e.g., power distribution). For example, embodiments of the modular connectors may include general male and female structural components with integrated electrical enclosures such that mechanical and electrical connections can be established simultaneously. Engagement of the integrated electrical enclosures forms a circuit which can deliver power to receptacles, switches, lights, and any other electrical devices associated with the framing assembly.

The embodiments described herein improve upon the fastening process associated with construction framing by leveraging modular connectors to provide suitable mechanical and/or electromechanical interconnections between the studs and tracks of a framing assembly; and in some embodiments, require no costly modifications to existing conventional framing studs and tracks commonly deployed.

Figure 1A:
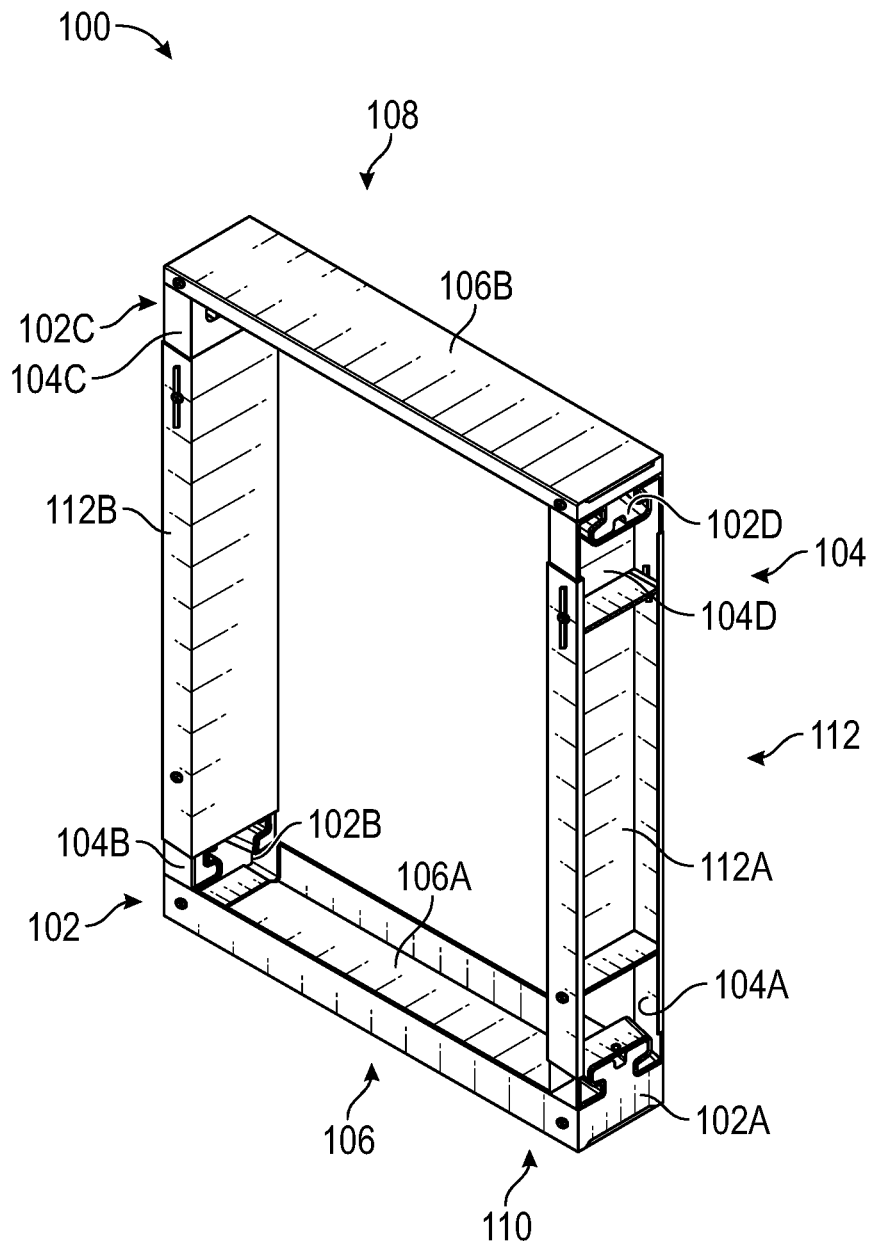
FIG. 1A is a perspective view of one embodiment of a framing assembly comprising a plurality of connectors for interconnecting tracks and studs of the framing assembly.
Figure 1B:
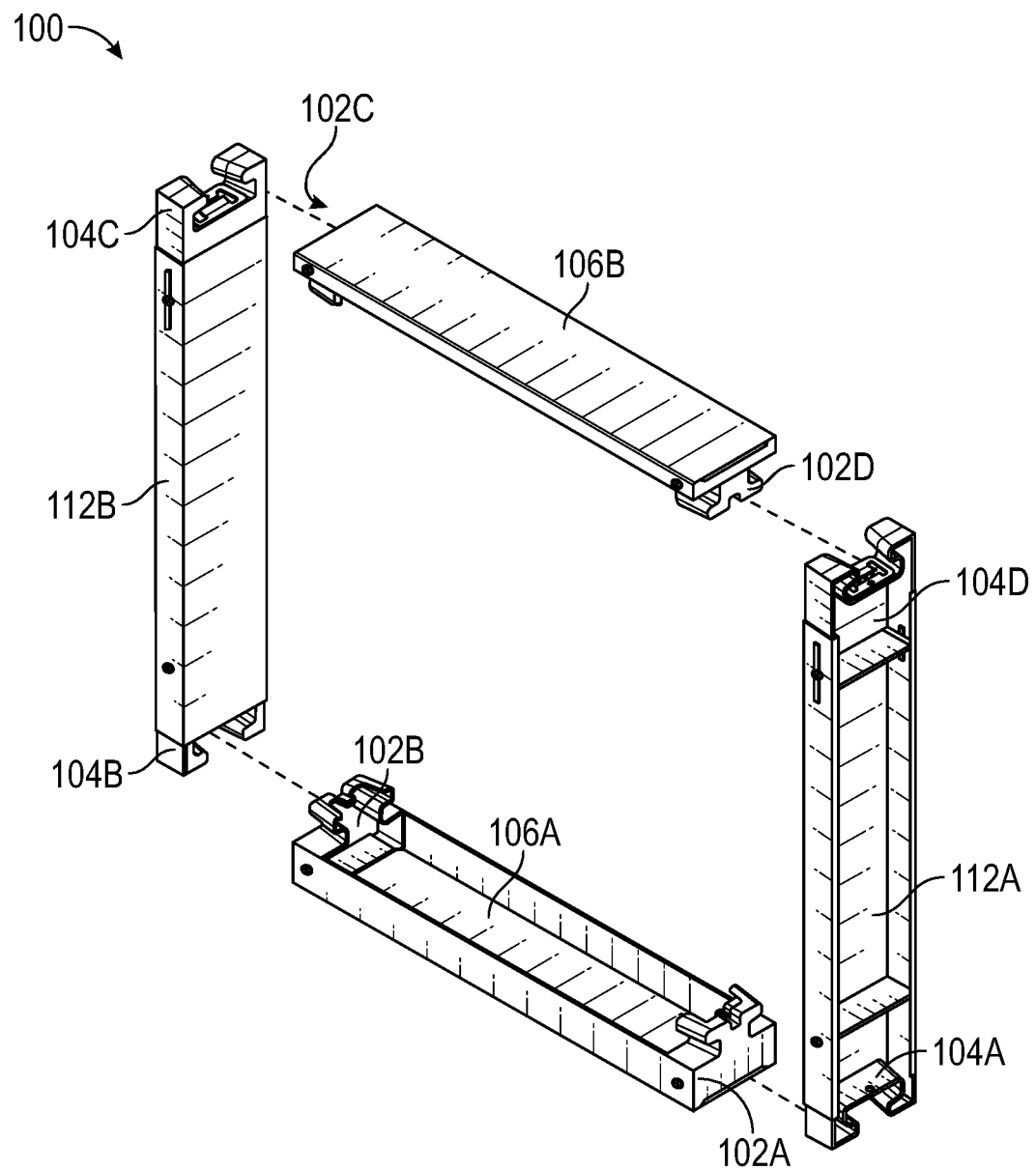
FIG. 1B is an exploded perspective view of the framing assembly of FIG. 1A.

Referring now to the Drawings, FIG. 1A and FIG. 1B illustrate a framing assembly 100. In general, the framing assembly 100 may be formed using any number of first connectors 102 and second connectors 104 configured for snap-fit engagement with one another which accommodates the efficient formation of mechanical and/or electrical interconnections between various components of the framing assembly 100, as further described herein. The framing assembly 100 may generally define a wall frame or portions thereof, a ceiling frame, or may be leveraged for any framing application requiring a framing structure. The framing assembly 100 is not limited to the general rectangular-shape configuration depicted, and variations of the framing assembly 100 are contemplated such that the components depicted may be arranged in any predetermined configuration to assemble an overall frame for a building structure or otherwise. Further, while the first connectors 102 and the second connectors 104 are described herein generally as defining discrete components separate from each other and other components of the framing assembly 100, it is contemplated that in some embodiments the first connector 102 and/or the second connector 104 may be manufactured integrally with either of the studs or tracks of the framing assembly 100 by way of a robotic assembly process or otherwise.

In the example shown, the framing assembly 100 may generally include a plurality of tracks 106, represented as track 106A and track 106B. As indicated, the track 106A and the track 106B may be aligned in parallel to define a top end 108 of the framing assembly 100 and a bottom end 110 of the framing assembly 100 opposite the top end 108. In addition, a plurality of studs 112, represented as stud 112A and stud 112B, may be positioned vertically between the tracks 106 at any number of predetermined locations, such that the interconnections between the studs 112 and the tracks 106, made possible by the first connectors 102 and second connectors 104, collectively forms the framing assembly 100.

Figure 2:
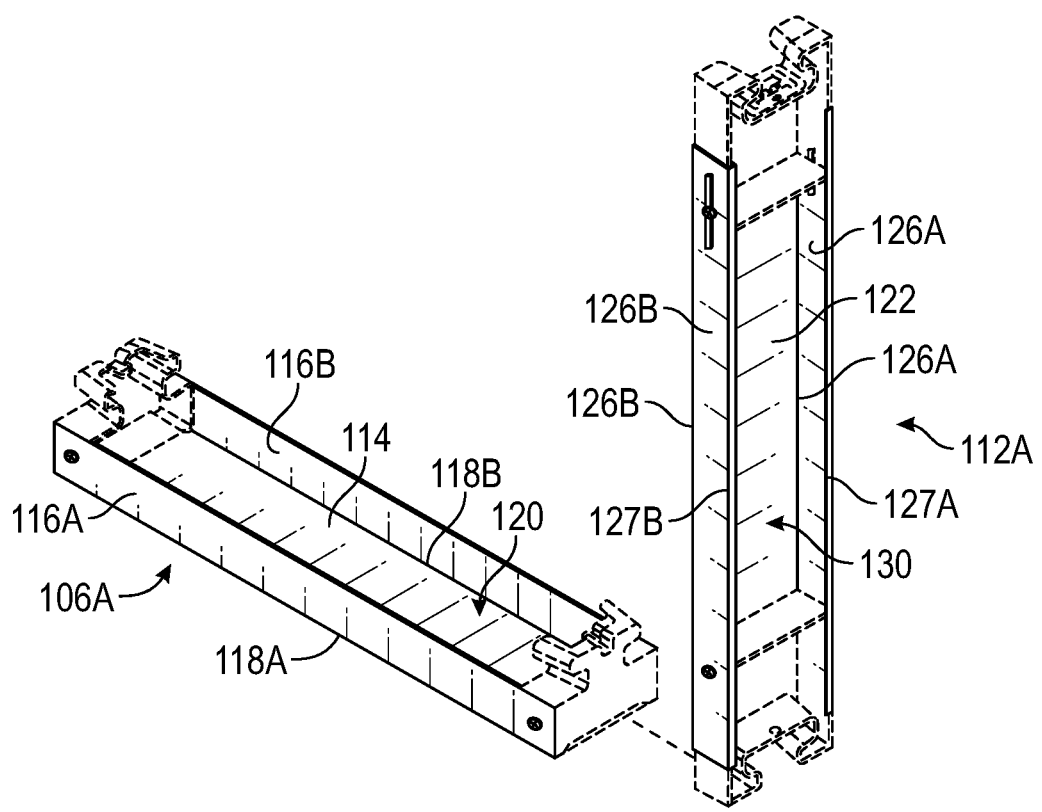
FIG. 2 is a perspective view of a stud and a track of the framing assembly of FIGS. 1A-1B.

Referring to FIG. 2, the track 106A and the stud 112A of FIGS. 1A-1B are depicted to illustrate further aspects of each of the tracks 106 and the studs 112. As indicated, the track 106A includes a track web 114, a first track flange 116A, and a second track flange 116B. The first track flange 116A is defined along a first lateral edge 118A of the track web 114, and the second track flange 116B is defined along a second lateral edge 118B of the track web 114 opposite the first lateral edge 118A. The track 106A further defines a track channel 120 formed collectively by the track web 114, the first track flange 116A, and the second track flange 116B. In general, the track 106A is identical in form and shape with respect to any one of the tracks 106 (e.g., track 106B), such that each of the tracks 106 generally share a common or uniform profile configuration. In some cases, the track 106A may be referred to as a U-shaped track (or U-shaped joist) widely available and often deployed in framing applications.

Similarly, the stud 112A includes a stud web 122, a first stud flange 124A, and a second stud flange 124B. The first stud flange 124A is defined along a first lateral edge 126A of the stud web 122, and the second stud flange 124B is defined along a second lateral edge 126B of the stud web 122 opposite the first lateral edge 126A. The stud 112A further defines a stud channel 130 formed collectively by the stud web 122, the first stud flange 124A, and the second stud flange 124B. In general, the stud 112A is identical in form and shape with respect to any one of the studs 112 (e.g., stud 112B), such that each of the studs 112 generally share a common or uniform profile configuration. In some embodiments, the stud 112A may be C-shaped, such that the stud 112A further includes a third stud flange 127A extending orthogonally from the first stud flange 124A, and a fourth stud flange 127B extending orthogonally from the second stud flange 124B. In other cases, the stud 112A may be a U-shaped stud (or U-shaped joist). C-shaped and U-shaped studs and tracks are often deployed in framing applications; yet, more efficient technical methods of interconnecting these components are desired.

Referring back to FIGS. 1A-1B, in general, the first connectors 102 (represented as first connector 102A, first connector 102B, first connector 102C, and first connector 102D) may be mounted to or otherwise engaged along the tracks 106, and the second connectors 104 (represented as second connector 104A, second connector 104B, second connector 104C, and second connector 104D) may be mounted to or otherwise engaged along the studs 112, as shown and further described herein. In some embodiments, the first connectors 102 may be pre-fastened or manufactured along any longitudinal position of the tracks 106, and arrangement and engagement of the first connectors 102 relative to the tracks 106 may predetermined to increase efficiency of forming the framing assembly 100. As further described herein, the first connectors 102 and the second connectors 104 may be implemented as indicated in FIGS. 1-2 to mechanically and/or electromechanically interconnect the tracks 106 with the studs 112.

Figure 1C:
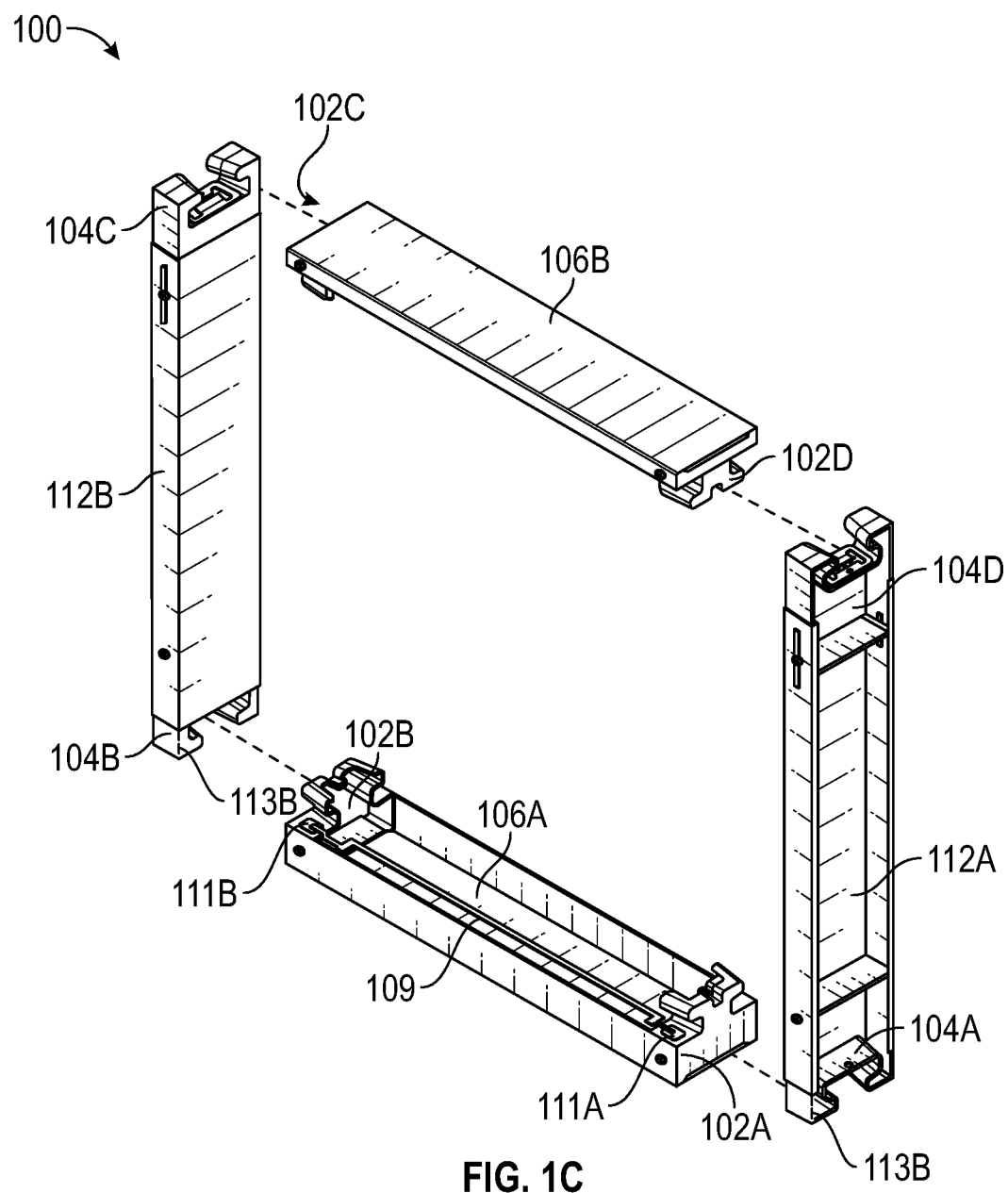
FIG. 1C is an exploded perspective view of the framing assembly of FIG. 1A equipped with electrical component sub features.

Referring to FIG. 1C, it should be appreciated that in some embodiments the components of the framing assembly 100 may be equipped with one or more sub-features to form electromechanical connections as the first connectors 102 and the second connectors 104 are engaged to interconnect the studs 112 and the tracks 106. In some embodiments, the framing assembly 100 includes a bus 109 comprising one or more conductive layers extending along the track 106A. The bus 109 may be electrically connected to an electrical enclosure 111A positioned along the first connector 102A adjacent one end of the bus 109 and an electrical enclosure 113B positioned along the first connector 102B adjacent another end of the bus 109 opposite the electrical enclosure 11A as shown (and may further be connected to a power supply (not shown). In addition, respective electrical enclosures 113B may be defined along the second conductor 104B and the second connector 104B configured to electrically connect with the electrical enclosure 111A and the electrical enclosure 111B during formation of the framing assembly 100 or otherwise. Implementing these features, a circuit may be formed along the track 106A, as the stud 112B, the stud 112A and the track 106A are mechanically interconnected by way of the first connectors 102 and second connectors 104. For example, as the first connector 102B is mechanically engaged to the second connector 104B, the electrical enclosure 111B may be electrically connected to the electrical enclosure 113B (to, e.g., extend electrical power traversing the bus 109 to the stud 112B). The electrical enclosures of FIG. 1C may include contact pads, plugs and sockets, or any number or type of connection mechanisms for forming an electrical circuit. Accordingly, the framing assembly 100 may be configured for mechanical interconnection as well as simultaneous electrical connection, as desired.

Figure 3A:
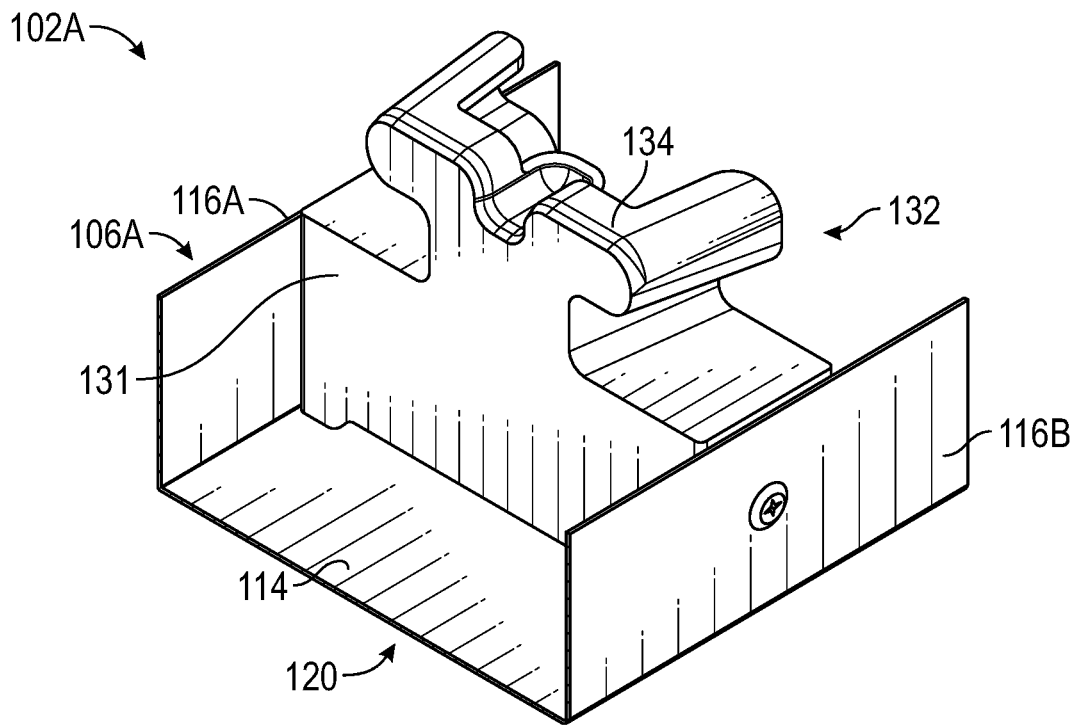
FIG. 3A is a perspective view of a first connector taken from FIGS. 1A-1B, including a cut-out portion of a track to indicate possible engagement of the first connector to the track.

Referring to FIG. 3A, a first connector 102A taken from the first connectors 102 is shown in order to set out further detail regarding aspects of the first connectors 102. In some embodiments, the first connector 102A is identical in form and shape with respect to the first connector 102B, the first connector 102C, and the first connector 102D, such that the first connectors 102 generally define a common or uniform profile configuration. As indicated, the first connector 102A generally comprises a base 131, and a first connector body 132 defining a mounting portion 134 extending over the base 131. The base 131 generally defines a three-dimensional (3D) rectangular shape configuration or substrate which may be configured in size and dimensions suitable for insertion within the track channel 120 or the stud channel 130. For example, as shown in FIG. 3A, the base 131 of the first connector 102A may be positioned along any predetermined longitudinal position of the track web 114 and wedged between the first track flange 116A and second track flange 116B in the manner shown such that the base 131 is substantially housed within a portion of the track channel 120.

Figure 3B:
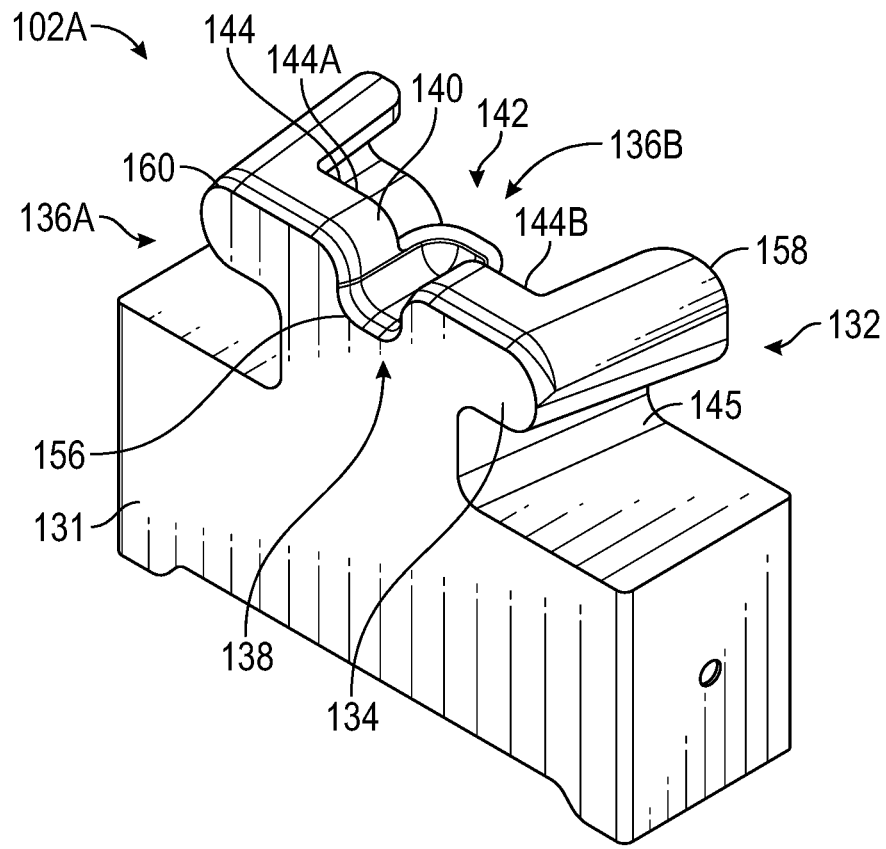
FIG. 3B is a perspective view of the first connector of FIG. 3A without the cut-out portion of a track.

Referring to FIG. 3B, the first connector 102A defines a first side 136A and a second side 136B opposite the first side 136A. The mounting portion 134 generally includes a deflection portion 138 defining a deflection surface 140 extending at least partially between the first side 136A and the second side 136B, a retention cavity 142 defined between the first side 136A and the second side 136B of the first connector 102A, and an edge portion 144 abutting the deflection portion 138. In some embodiments, the mounting portion 134 may be in communication with the base 131 via a middle portion 145. In some embodiments, the edge portion 144 defines a pair of edges 144A and 144B in parallel alignment on opposite lateral sides of the mounting portion 134.

Figure 3C:
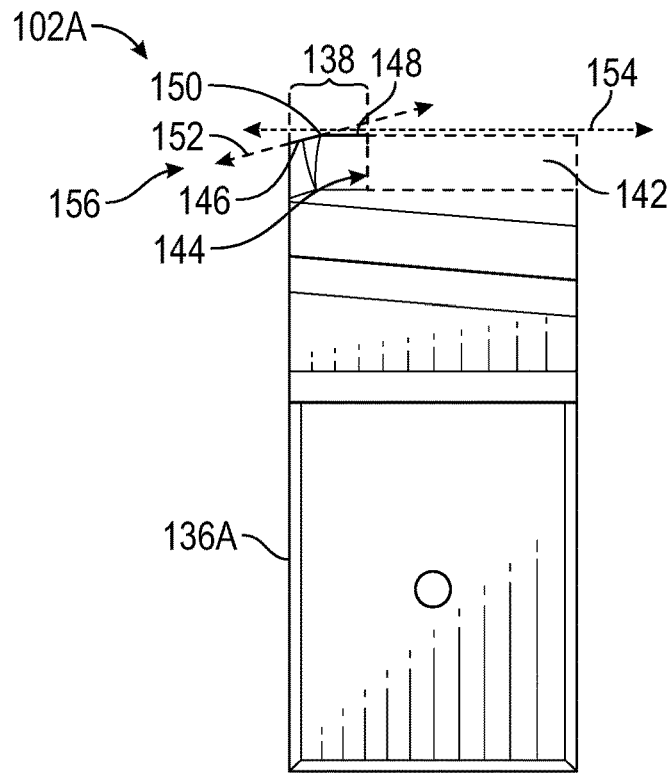
FIG. 3C is a side view of the first connector of FIG. 3A with portions in phantom to indicate a retention cavity.

As indicated in FIG. 3C, the deflecting portion 138 may comprise any number of sections to facilitate engagement with any one of the second connectors 104 as further described herein. Specifically, the deflecting portion 138 may define a first section 146 and a second section 148 in communication with the first section 146 at an apex 150, such that the first section 146 is generally defined between the terminal end of the first side 136A and the apex 150, and the second section 148 is generally defined between the apex 150 and extends to the edge portion 144 and the retention cavity 142 (represented in phantom in FIG. 3C). As indicated, the first section 146 may slope downwardly from the apex 150 to the first side 136A along a first longitudinal axis 152, and the second section 148 may generally extend horizontally along a second longitudinal axis 154 from the apex 150 to the edge portion 144.

Figure 3D:
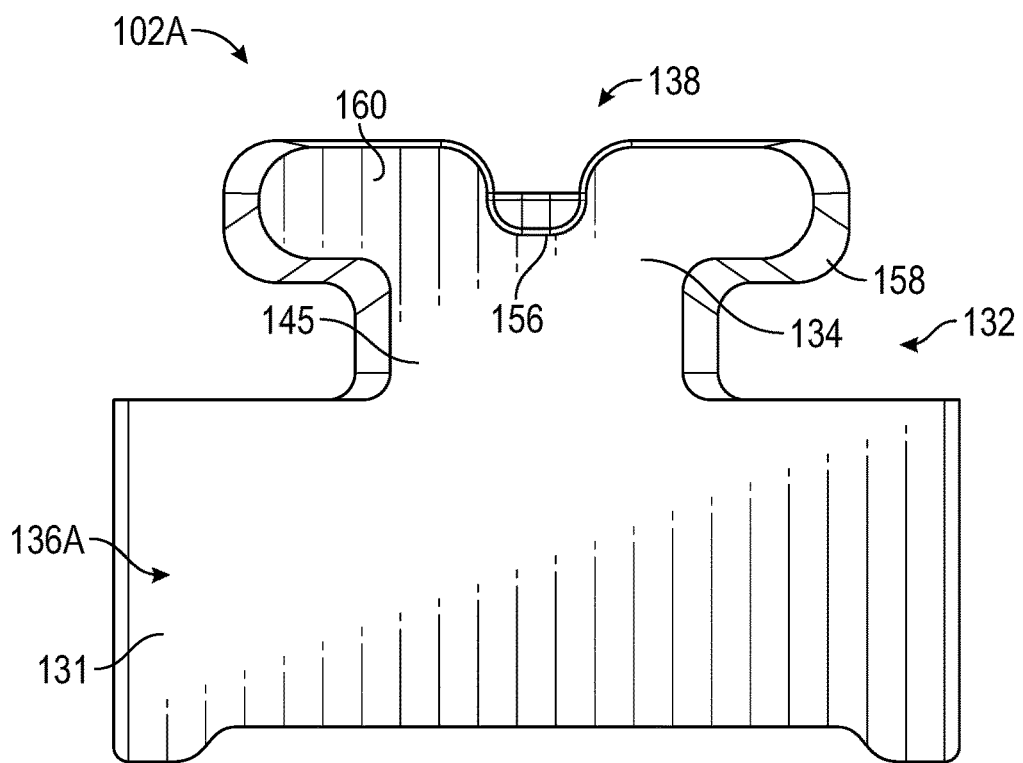
FIG. 3D is a front view of the first connector of FIG. 3A.
Figure 3E:
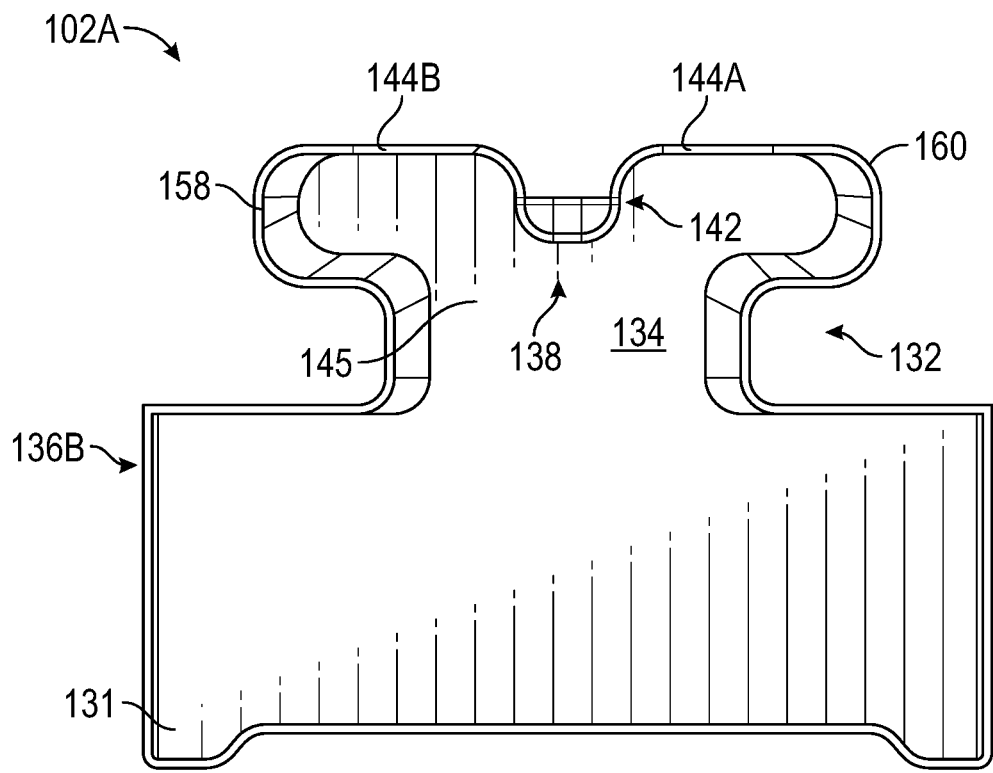
FIG. 3E is a back view of the first connector of FIG. 3A.
Figure 3F:
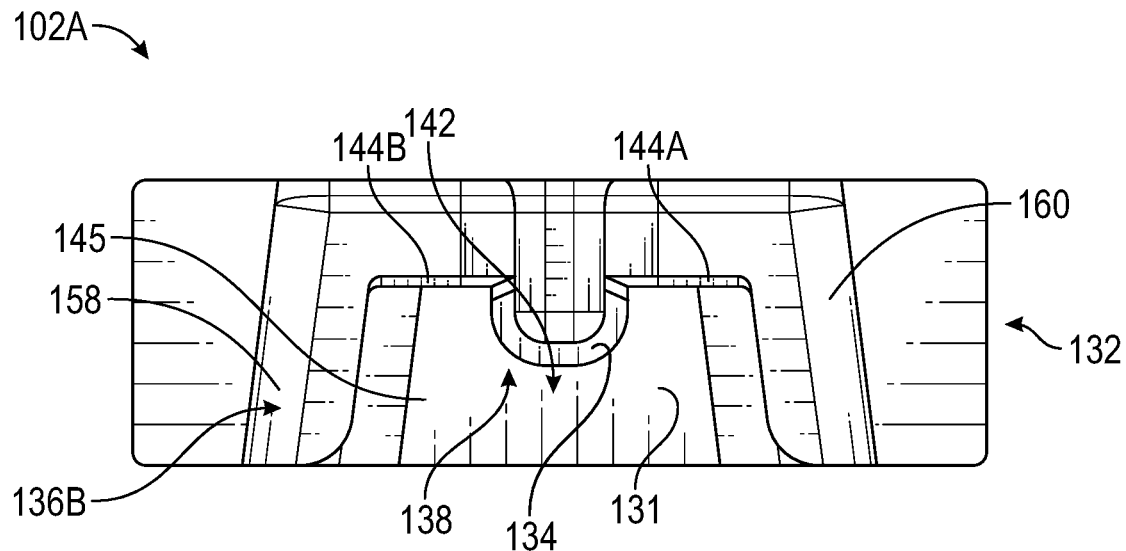
FIG. 3F is a top partial plan view of the first connector of FIG. 3A.

Further, as indicated in FIGS. 3B-3D, the mounting portion 134 may define an access recess 156 along the first side 136A in communication with the first section 146 of the deflection portion 138. As shown, the access recess 156 may define a general semi-circular shape with the access recess 156 formed concavely along the first side 136A. The access recess 156 accommodates disengagement of the first connector 102A from any one of the second connectors 104 after the initial engagement, as further described herein.

In some embodiments as shown in FIG. 3B, along opposite lateral sides of the deflecting portion 138, the mounting portion 134 may further define a first chamfered arm 158 and a second chamfered arm 160 positioned in parallel arrangement relative to one another over opposite lateral ends of the base 131. In this manner, the mounting portion 134 may generally define a T-shape configuration when viewed directly from the front side 136A as indicated in FIG. 3D. As further described herein, structural aspects of any of the second connectors 104 may be configured to receive or otherwise correspond to this embodiment of the mounting portion 134 to facilitate engagement.

Figure 4A:
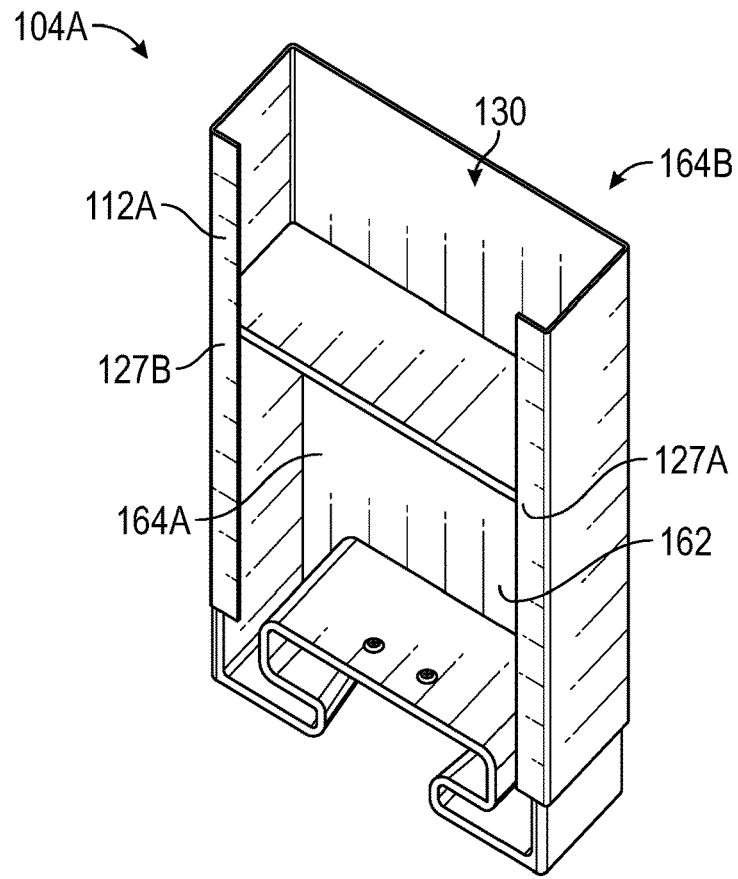
FIG. 4A is a perspective view of a second connector taken from FIGS. 1A-1B, including a cut-out portion of a stud to indicate possible engagement of the second connector to the stud.

Referring to FIG. 4A, a second connector 104A taken from the second connectors 104 is shown in order to set out further detail regarding aspects of the second connectors 104. In some embodiments, the second connector 104A is identical in form and shape with respect to any one of the second connectors 104; such that each of the second connectors 104 generally defines a common or uniform profile configuration. As indicated, the second connector 104A includes a second connector body 162 defining a first side 164A and a second side 164B. The second connector body 162 generally defines a 3D rectangular shape configuration which may be configured in size and dimensions suitable for insertion within the stud channel 130 (or the track channel 120). For example, as shown in FIG. 4A, the second connector body 162 may be telescopically received within the stud channel 130 of the stud 112A of FIG. 2, and positioned along a predetermined longitudinal position of the stud 112A. In some embodiments as shown, portions of the stud 112A, such as the third stud flange 127A and the fourth stud flange 127B, may at least partially wrap around the second connector 104A to facilitate engagement of the second connector 104A to the stud 112A.

Figure 4B:
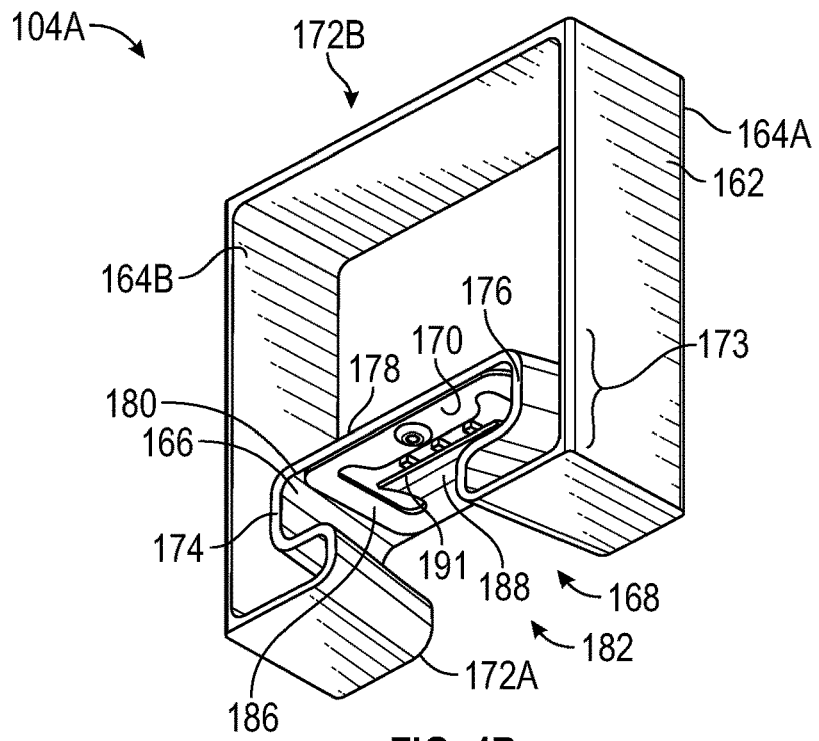
FIG. 4B is a perspective view of the second connector of FIG. 4A without the cut-out portion of a stud.
Figure 4C:
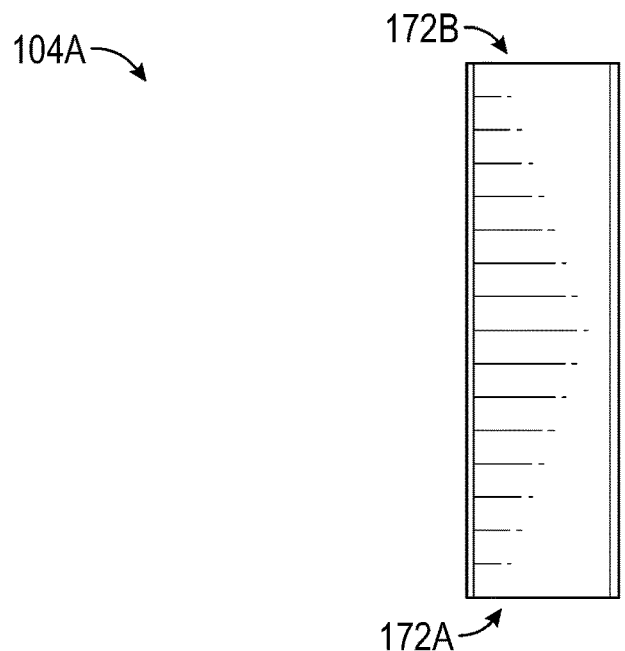
FIG. 4C is a side view of the second connector of FIG. 4A.
Figure 4D:
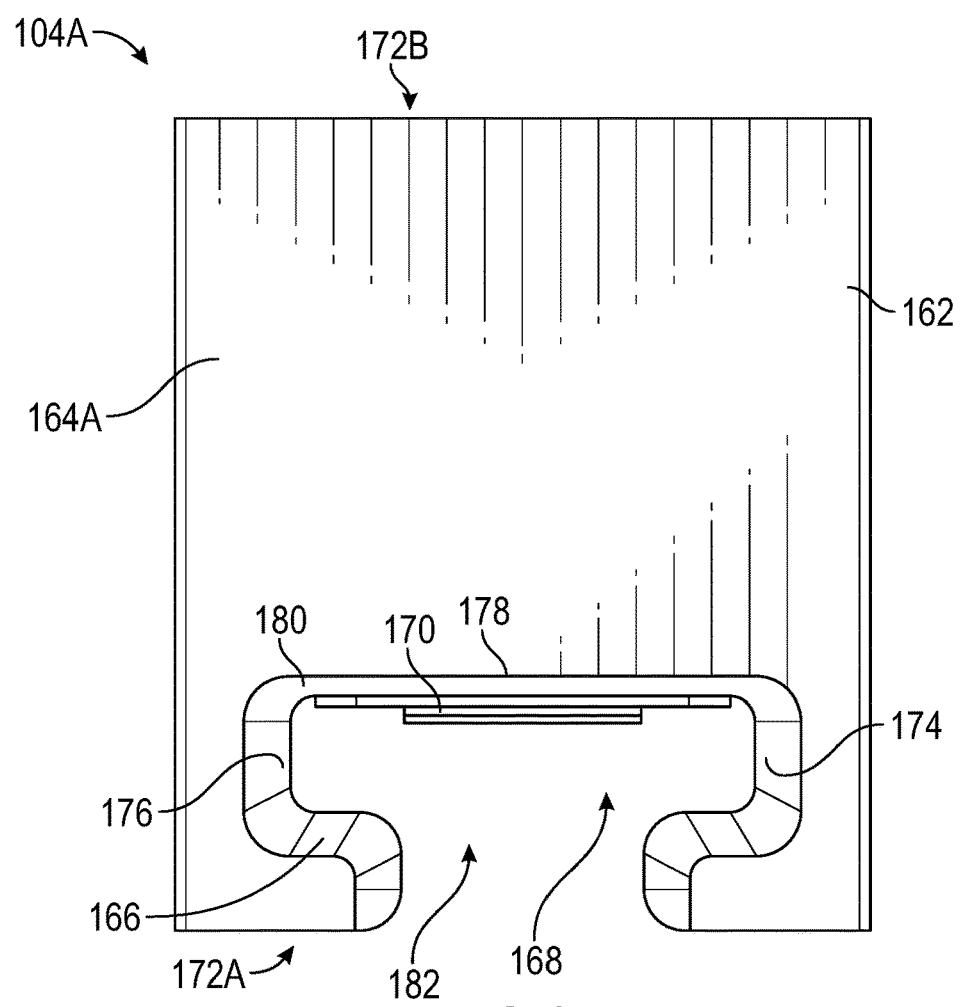
FIG. 4D is a rear view of the second connector of FIG. 4A.
Figure 4E:
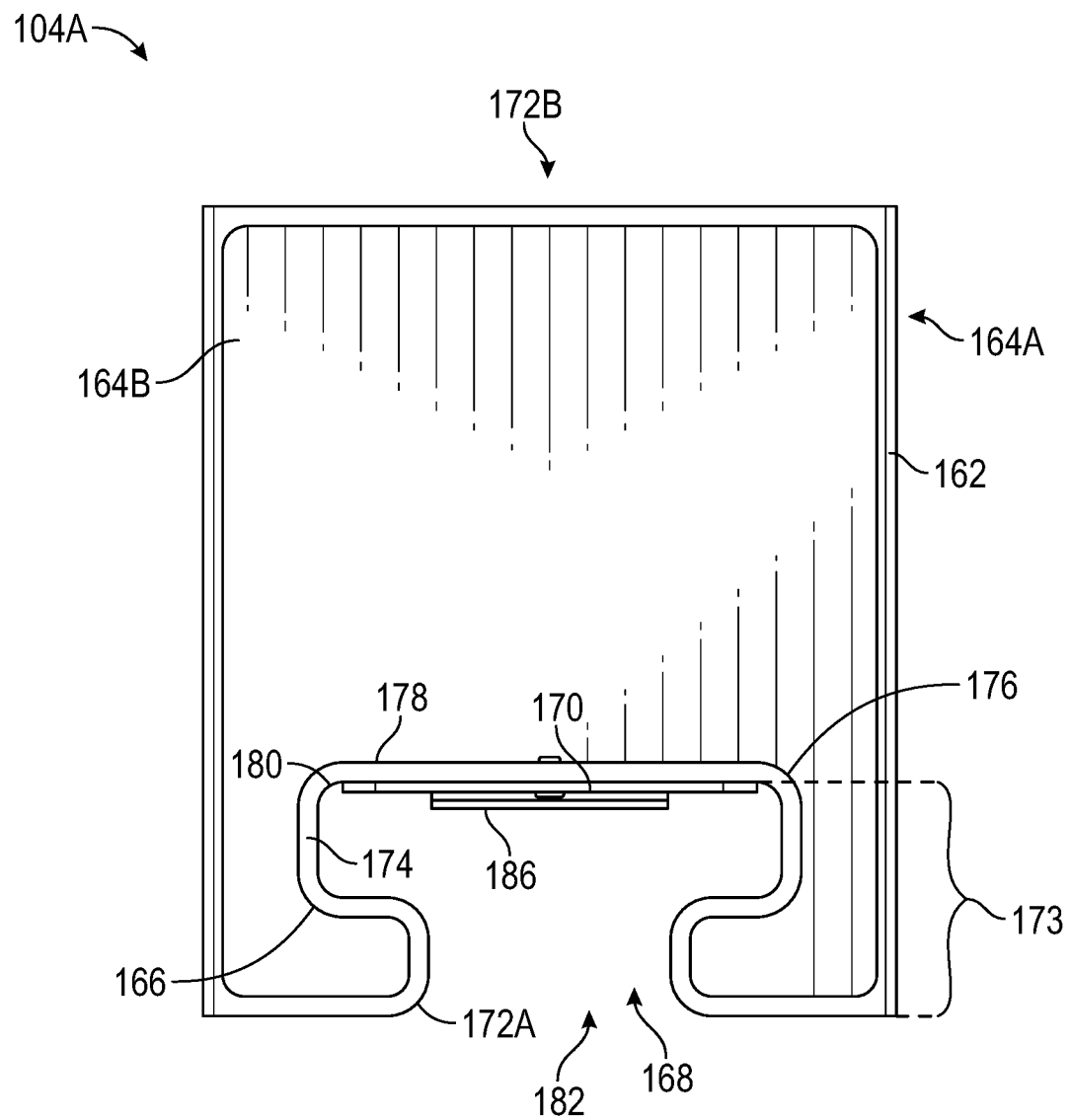
FIG. 4E is a front view of the second connector of FIG. 4A.

Referring to FIG. 4B, the second connector body 162 generally includes a mounting recess 166, a channel 168 defined by the mounting recess 166, and a retention clip 170. The mounting recess 166 is generally formed along a bottom side 172A of the second connector body 162, and extends concavely within the second connector body 162 from the bottom side 172A to a predetermined depth 173 between the bottom side 172A and a top side 172B of the second connector body 162 opposite the bottom side 172A. In some embodiments, the mounting recess 166 includes a first side portion 174, a second side portion 176, and a bottom portion 178 positioned between the first side portion 174 and the second side portion 176 as indicated. The bottom portion 178 of the mounting recess 166 defines a surface 180 that is substantially planar such that the retention clip 170 can be mounted thereto. In some embodiments, the first side portion 174 and the second side portion 176 of the mounting recess each define a chamfered shape such that the mounting recess 166 is configured to securely receive the first chamfered arm 158 and the second chamfered arm 160 of the first connector 102A, respectively, as described herein.

In some embodiments, the mounting recess 166 naturally defines an opening 182 over the bottom portion 178 between the first side portion 174 and the second side portion 176 such that the channel 168 is in communication with the opening 182 and extends from the first side 164A to the second side 164B of the second connector body 162. The opening 182 and the channel 168 collectively receive structure of the first connector 102A including the mounting portion 134 when the first connector 102A is engaged to the second connector 104A. It is contemplated that the opening 182 and the channel 168 may take the form of any shape configuration suitable for engaging with the first connector 102A as further described herein.

The retention clip 170 may be mounted to or otherwise positioned along the surface 180 of the bottom portion 178 of the mounting recess 166. In some embodiments, the retention clip 170 includes a base portion 186 that may be mounted along the surface 180. The retention clip 170 may further include a flange 188 extending from the base portion 186 and defining a contact end 191. In some embodiments, the contact end 191, which generally defines an outermost or free end of the flange 188, is curved or angled away from the top side 172B and the bottom portion 178 of the retention clip 170 (as shown in FIG. 4B). In some embodiments, the retention clip 170 is comprised of a rigid or semi-rigid material such as a metal or steel that generally maintains an original shape configuration shown unless a deflecting force is applied to the flange 188 as further described herein. In general, for example, the flange 188 of the retention clip 170 temporarily deflects along the deflection surface 140 of the first connector 102A and snaps or otherwise engages to within the retention cavity 142 of the first connector body, as further described herein.

Referring to FIGS. 5A-5C, and FIGS. 6A-6E, an exemplary snap engagement between the first connector 102A and second connector 104A is shown which may facilitate the interconnection of components and generally accommodate the efficient and secure formation of the framing assembly 100. As indicated in a first phase of the engagement shown in FIG. 5A and FIG. 6B, the first side 136A of the first connector 102A may be oriented towards the first side 164A of the second connector 104A, such that the retention clip 170 of the second connector 104A is in general horizontal alignment with a top side 192B of the first connector 102A, opposite a bottom side 192A of the first connector 102A. In addition, the mounting portion 134 of the first connector 102A may be oriented towards the mounting recess 166 of the second connector 104A.

Figure 5A:
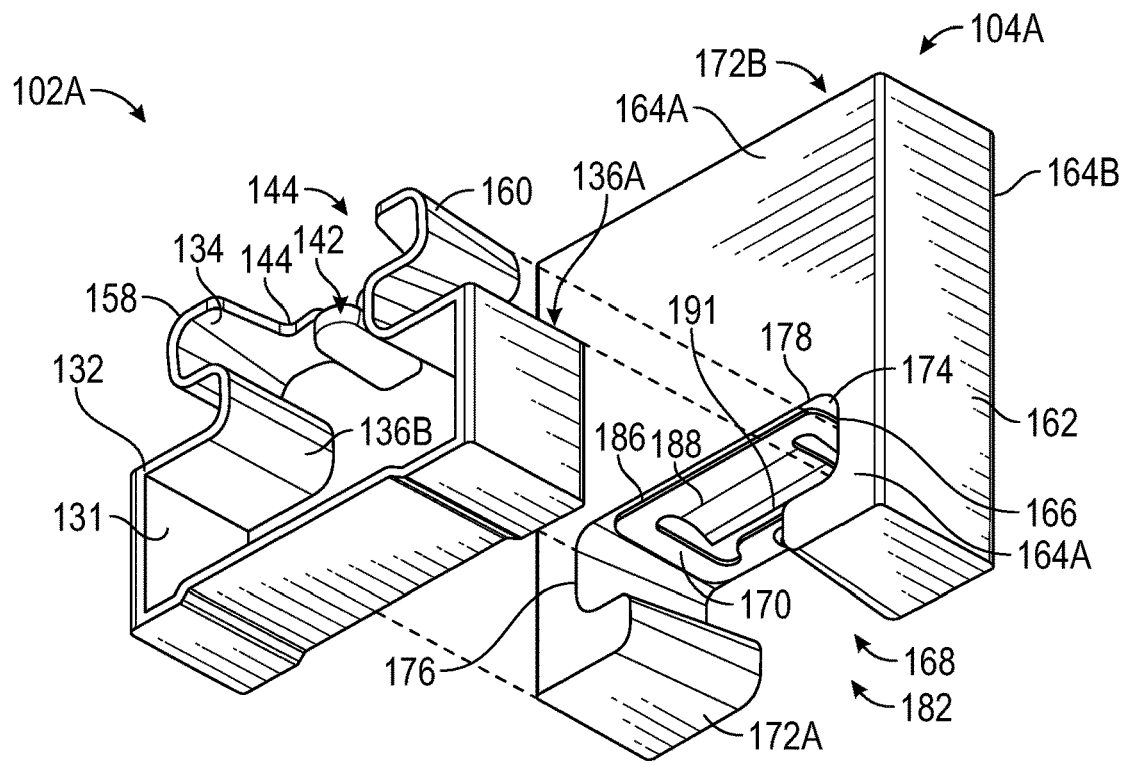
FIGS. 5A-5C are perspective views illustrating engagement between the first connector of FIGS. 3A-3F and the second connector of FIGS. 4A-4E to form a locked configuration in FIG. 5C which accommodates construction of the framing assembly as described herein.
Figure 5B:
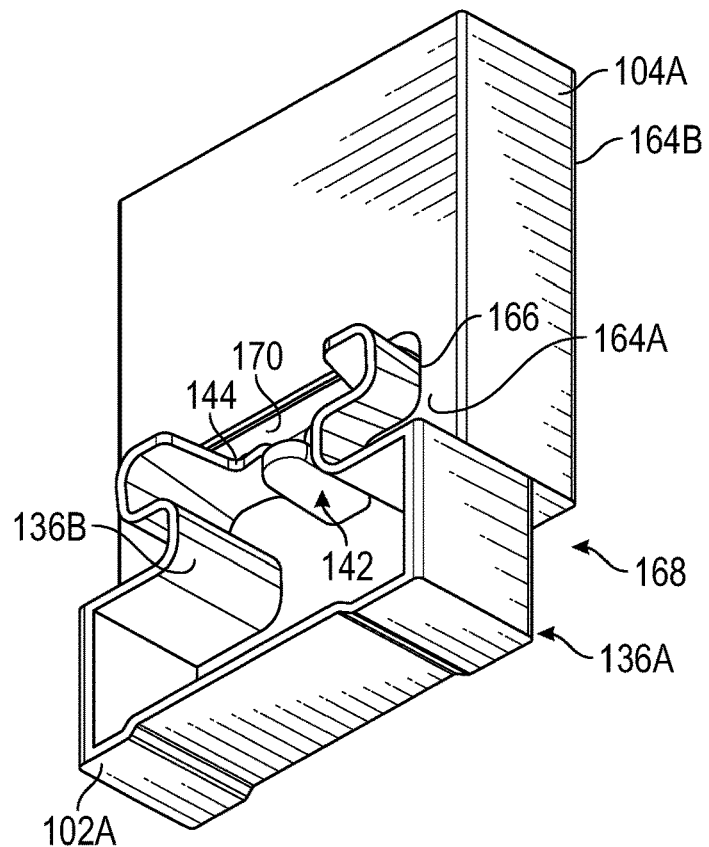
Figure 6A:
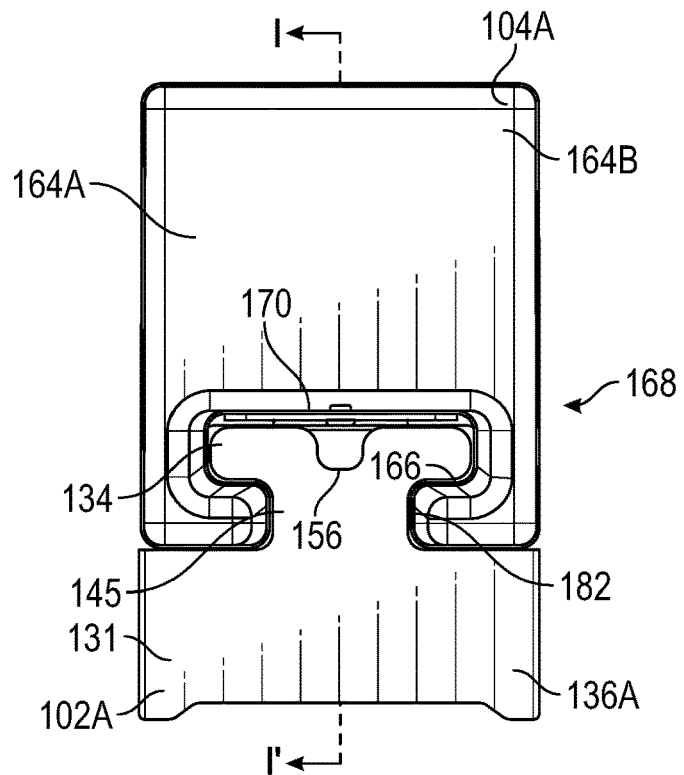
FIG. 6A is a rear view of the first connector and the second connector of FIG. 5C fully engaged and forming the locked configuration of FIG. 5C.
Figure 6B:
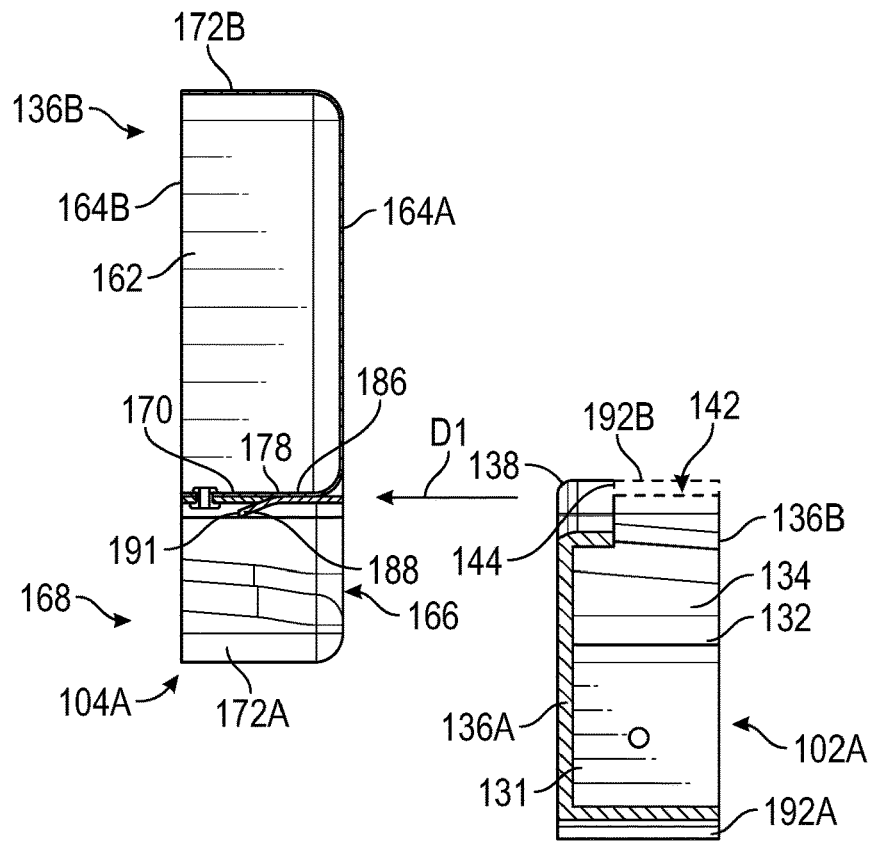
FIG. 6B is a cross-sectional view taken along section line I-I' of FIG. 6A illustrating one phase of the engagement between the first connector and the second connector of the framing assembly.
Figure 6C:
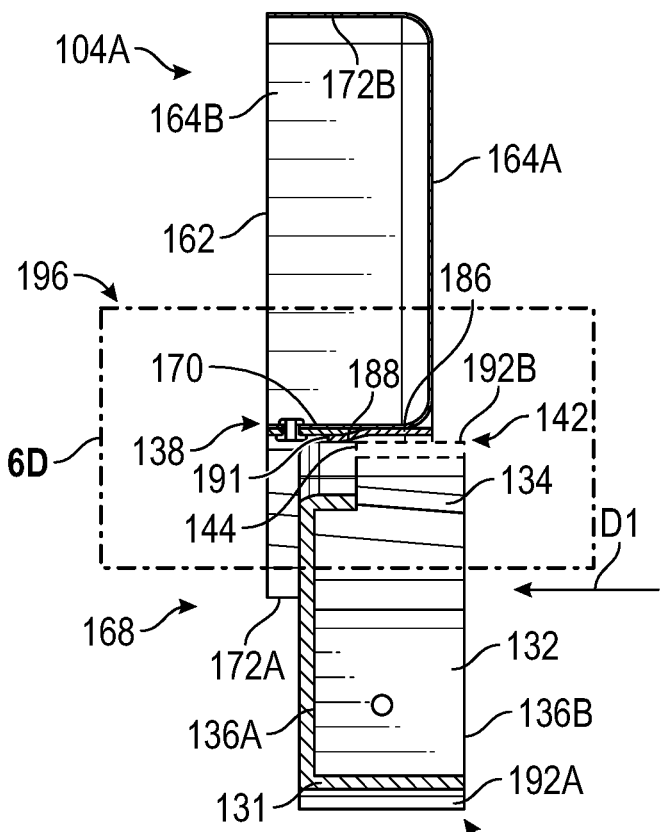
FIG. 6C is a cross-sectional view taken along section line I-I' of FIG. 6A illustrating another phase of the engagement between the first connector and the second connector.
Figure 6D:
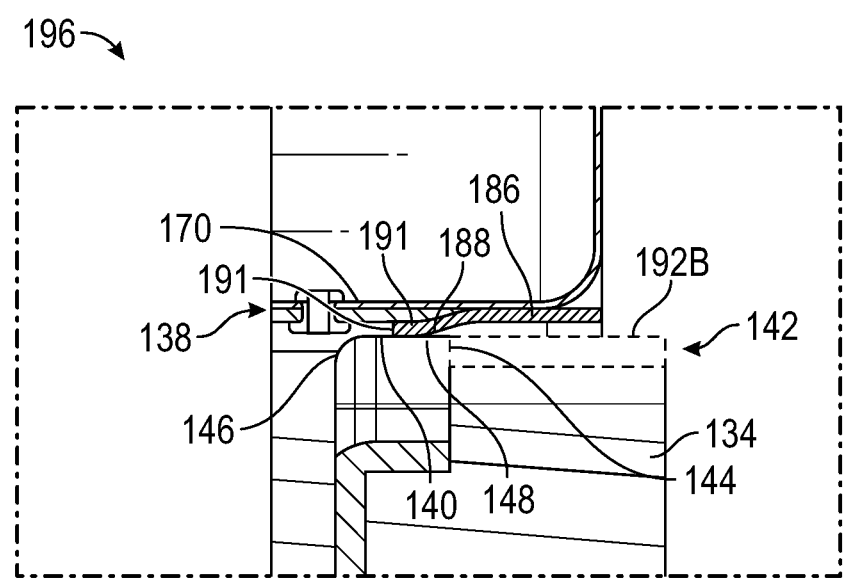
FIG. 6D is a detail view taken from the area indicated in FIG. 6C.

Referencing a second phase of the engagement shown in FIG. 5B, FIG. 6C, and FIG. 6D, the mounting portion 134 of the first connector 102A may be inserted within the channel 168 of the second connector 104A and urged in the direction D1 shown in FIG. 6B towards the second side 164B of the second connector 104A. As indicated in FIG. 6B, as the mounting portion 134 traverses the channel 168, the deflecting portion 138 ultimately engages with the contact end 191 of the flange 188 of the retention clip 170, causing the contact end 191 and the flange 188 to temporarily deflect away from the bottom side 172A of the second connector 104A. Specifically, the contact end 191 initially contacts the first section 146 of the deflecting portion 138 and drags along the first section 146 and along the second section 148, while temporarily deflected as described, until the contact end 191 traverses the entire deflection portion 138. The angled surface of the first section 146 of the deflection portion 138 may facilitate the initial deflection of the flange 188. In other words, as the flange 188 and the contact end 191 temporarily deflect or compress along the deflection portion 138 as described, the flange 188 may temporarily shift to a flattened configuration, temporarily reducing the curvature of the flange 188 relative to the bottom portion 178 of the retention clip 170.

Figure 5C:
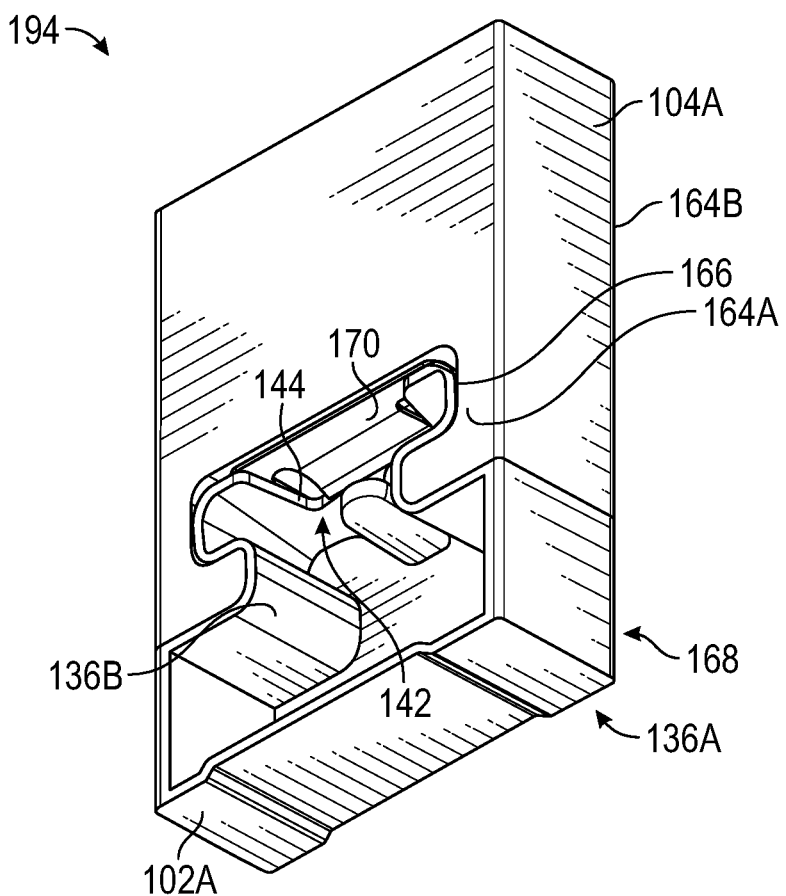
Figure 6E:
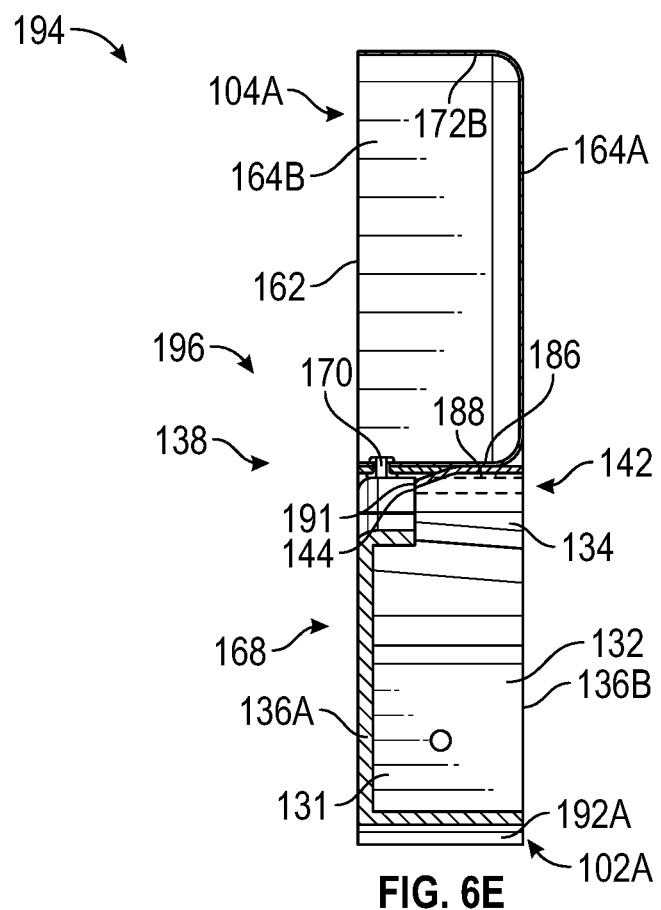
FIG. 6E is a cross-sectional view taken along section line I-I' of FIG. 6A illustrating a final phase or final engagement between the first connector and the second connector such that the connectors form the locked configuration described herein.

Referencing a third phase of the engagement and a locked configuration 194 shown in FIG. 5C and FIG. 6E, the mounting portion 134 of the first connector 102A may continue to be urged in the direction D1 shown in FIG. 6C towards the second side 164B of the second connector 104A until the first connector 102A and the second connector 104A form the locked configuration 194 shown such that the first connector 102A and the second connector 104A are oriented in total vertical alignment; i.e., the first connector 102A and the second connector 104A share a common footprint. In this locked configuration 194, the first side 164A of the second connector 104A may be flush vertically with the second side 136B of the first connector 102A, and the second side 164B of the second connector 104A may be flush vertically with the first side 136A of the first connector 102A.

In addition, in the locked configuration 194, the contact end 191 completely traverses the deflection portion 138 from the first section 146 to the second section 148 of the deflecting portion 138, such that the contact end 191 clears the deflection portion 138 enabling the flange 188 and the retention clip 170 to return to its original configuration. Once the contact end 191 fully traverses the deflecting portion 138 and the retention clip 170 snaps back or otherwise returns to its original configuration as described, at least a portion of the flange 188 passes to within the retention cavity 142 of the first connector body 132, and the contact end 191 is oriented towards and/or contacts the edge portion 144, thereby restricting movement of the first connector 102A away from the second connector 104A (in a direction opposite D1).

In addition, in some embodiments, physical structure of the second connector 104A or the first connector 102A may restrict movement of the first connector 102A away from the second connector 104A (further in the direction D1) beyond the locked configuration 194. In other words, once the mounting portion 134 of the first connector 102A is entirely disposed within the mounting recess 166 such that the first connector 102A and the second connector 104A are at least positioned in general vertical alignment and the contact end 191 of the retention clip 170 abuts the edge portion 144, portions of the second connector 104A restrict horizontal movement of the first connector 102A relative to the second connector 104A in the direction D1 beyond the locked configuration 194. For example, the mounting recess 166 and/or the opening 182 of the second connector 104A may include a shape configuration and suitable dimensions such that the mounting portion 134 frictionally engages within the mounting recess 166 as the mounting portion 134 is received by the mounting recess 166 to align the first connector 102A and the second connector 104A in the locked configuration 194. More specifically, in some embodiments, the width of the channel 168 along the first side portion 174 and second side portion 176 and/or the opening 182 may gradually decrease in size from the first side 164A to the second side 164B of the second connector 104A to facilitate this frictional engagement and limit movement of the mounting portion 134 through the channel 168 as described beyond the locked configuration 194.

Further, the contact end 191 of the retention clip 170 abutting the edge portion 144 of the first connector 102A restricts horizontal movement of the first connector 102A relative to the second connector 104A in a direction opposite direction D1. Accordingly, in the locked configuration 194 shown and described, the first connector 102A is at least temporarily locked in place relative to the second connector 104A in the x, y, and z-directions, which provides a secure engagement for interconnecting tracks and studs further engaged to each of the connectors. As indicated in FIGS. 6C-6E, the retention clip 170, the deflection portion 138, the edge portion 144, and the retention cavity 142 may collectively define a locking mechanism 196 that assists to form the locked configuration 194.

In addition, the locked configuration 194 may be disengaged by inserting a pair of pliers or other similar tool through the access recess 156 to again temporarily deflect the flange 188 of the retention clip 170 (not shown). Deflecting the flange 188 of the retention clip 170 again in this fashion may release the contact end 191 of the flange 188 from the retention cavity 142 to enable horizontal movement of the first connector 102A away from the second connector 104A to free the first connector 102A from the second connector 104A. In some embodiments, the flange 188 and the access recess 156 may be formed with dimensions suitable for accommodating a human finger to be inserted within the access recess 156 to release the flange 188 manually in this fashion.

The engagement illustrated in FIGS. 5A-5D and FIGS. 6A-6E may be employed to form the framing assembly of FIGS. 1A-1B. In some embodiments, the engagement of the second connectors 104 to the studs 112 accommodates head-of-wall deflection. For example, in applications of the framing assembly 100 intended for non-load bearing walls, the second connector 104A may be fixed relative to the stud 112A in the position shown, but the second connector 104D may merely be telescopically received within the stud channel (not shown) of the stud 112A in the position shown without being fixed relative to the stud 112A. As such, the second connector 104D may be engaged to the first connector 102D of the top track 106B as indicated, but is capable at least some movement longitudinally along the stud 112A even after engagement to the first connector 102D. This movement may accommodate head-of-wall deflection as any force or form of stress is imposed upon the track 106B.

The components of the framing assembly 100 described herein may be formed using any rigid or semi-rigid material such as a metal, steel, wood, plastic, or the like. Various modifications and variations to the framing assembly 100 are contemplated. For example, it should be appreciated that aspects of the first connectors 102 may be swapped with aspects of the second connectors 104, such that features of the first connectors 102 and second connectors 104 may be interchangeable in design, such as the retention clip 170. Further, the first connectors 102 may be manufactured integrally with the tracks 106 and the second connectors 104 may be manufactured integrally with the studs 112, or each of the aforementioned may be formed independently or discretely and later assembled.

Figure 7:
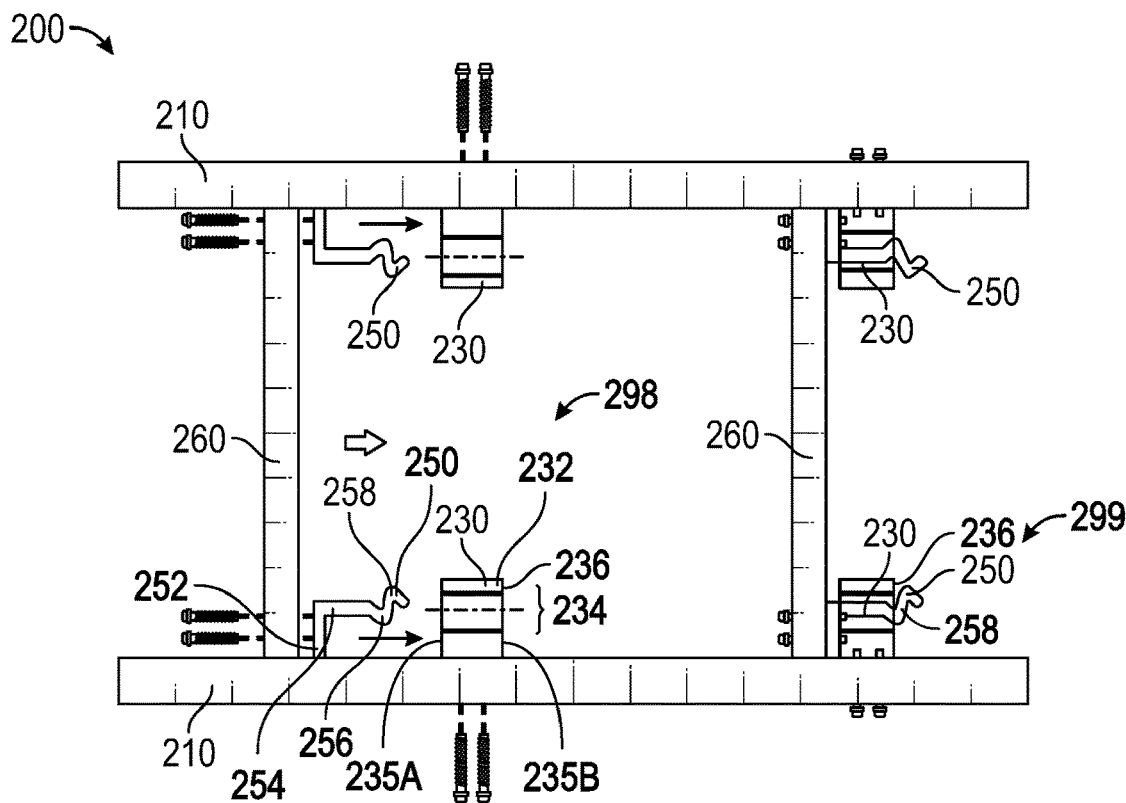
FIG. 7 is a side view of an illustration associated with another embodiment of a framing assembly as described herein.

Referring to FIG. 7, another embodiment of a framing assembly, designated framing assembly 200, is shown. The framing assembly 200 demonstrates that aspects of the framing assembly 100 may apply to more general embodiments of first connector and second connectors configured for temporary snap engagement. In this embodiment, the framing assembly 200 includes tracks 210 that may be interconnected with one or more studs 240 by engaging first connectors 230 arranged along the tracks 210 with second connectors 250 arranged along the studs 240; similar to the first connector 102A and second connector 104A described above. The first connectors 230 and second connectors 250 are adapted to snap together without any screws, rivets, welds, or the like, as further described herein. In some embodiments, the first connectors 230 may be fixed in place relative to the tracks 210 or adjustable along the length of the tracks 210, and at least some of the second connectors 250 may be fixed relative to the studs 240.

As indicated in FIG. 7, each of the first connectors 230 may generally comprise a body 232 including a channel 234 formed through the body 232 between a first opening 235A defined along a first side, and a second opening 235B defined along a second side opposite the first side. In addition, each of the first connectors 230 may include an edge portion 236 proximate to the second opening 235B of the body 232. As further shown, the second connectors 250 may generally include a body 252 defining a base 254, and a flange 256 extending from the base 254. As indicated, at least a portion of the flange 256 may be curved or angled away from the base 254, and may define an engagement portion 258. In general, the second connectors 250 may be engaged to the first connectors 230 by orienting the flange 256 towards the first opening 235A, and passing the flange 256 and at least a portion of the base 254 through the channel 234, such that the engagement portion 258 locks in place along the edge portion 236. In some embodiments, to pass the flange 256 and at least a portion of the base 254 through the channel 234 as described, the flange 256 may be configured to temporarily deflect relative to the base 254 to accommodate the aforementioned engagement. The base 254, the flange 256, and the edge portion 236 may collectively define a locking mechanism 298, which is implemented to form a locked configuration 299 between the first connectors 230 and the second connectors 250.

To assemble the framing assembly 200, the studs 240 may be engaged to one or more of the second connectors 250 (e.g., at both ends—top and bottom) of each stud, and the first connectors 230 may be mounted to or otherwise arrange along predetermined positions of the tracks 210. To commence assembly, one end of each of the studs 240 slides along one of the tracks 210 until a respective one of the second connectors 250 connects or engages with a corresponding one of the first connectors 230 as shown. The same process may be repeated for the opposite end of each of the studs 240 and respective tracks 210.

Figure 8:
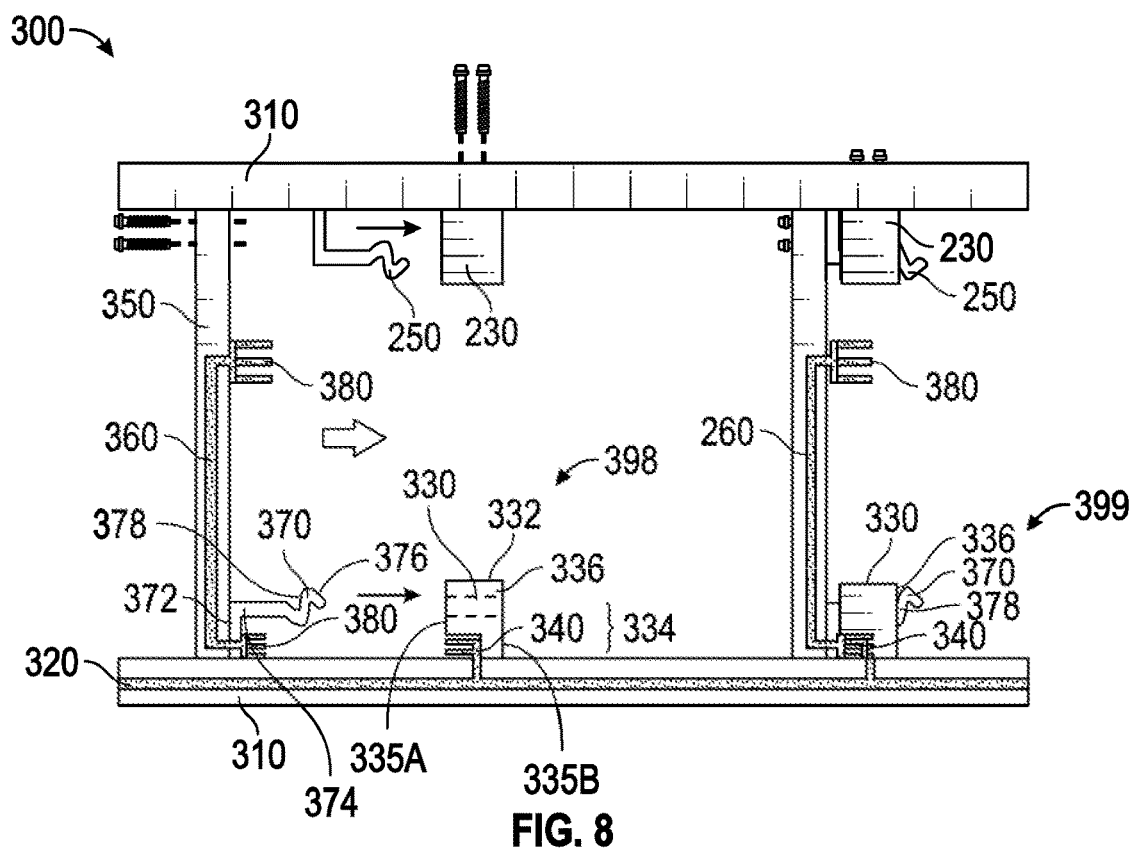
FIG. 8 is a side view of an illustration associated with another embodiment of a framing assembly configured for electromechanical connections, as described herein.

Referring to FIG. 8, another embodiment of a framing assembly, designated framing assembly 300, is shown. The framing assembly 300 is similar to the framing assembly 200 but includes integrated power distribution. For example, the framing assembly may utilize first connectors 330 and second connectors 370 to provide integrated power distribution across one or more studs 350 and tracks 310 in order to reduce manual electrical wiring and associated labor costs.

Similar to the framing assembly 200, at least some of the first connectors 330 may generally comprise a body 332 including a channel 334 formed through the body 332 between a first opening 335A defined along a first side, and a second opening 335B defined along a second side. In addition, each of the first connectors 330 may include an edge portion 336 proximate to the second opening 335B of the body. As further shown, the second connectors 370 may generally include a body 372 defining a base 374, and a flange 376 extending from the base 374. As indicated, at least a portion of the second connectors 370 may be curved or angled away from the base 374, and may define an engagement portion 378 adjacent the flange 376. In general, the second connectors 370 may be engaged to the first connectors 330 by orienting the flange 376 towards the first opening 335A, and passing the flange 376 and at least a portion of the base 354 through the channel 334, such that the engagement portion 378 locks in place along the edge portion 336 as indicated. In some embodiments, to pass the flange 376 and at least a portion of the base 354 through the channel 334 as described, the flange 376 may be configured to temporarily deflect relative to the base 374 to accommodate the aforementioned engagement. The base 374, the flange 376, and the edge portion 336 may collectively define a locking mechanism 398, which is implemented to form a locked configuration 399 between the first connectors 330 and the second connectors 370.

In some embodiments, the tracks 310 may include one or more of an integrated electrical bus 320 which may span longitudinally along portions of (or the length of) tracks 310. The bus 320 may include insulating material and three electrical conductors for hot, neutral, and ground connections. Further, the tracks 310 can be engaged to (or manufactured/formed with) the first connectors 330 capable of electromechanically engaging with the second connectors 370 arranged along the studs 350 to form electrical connections with the second connectors 370 and between the studs 350 and tracks 310 by virtue of these connections. As further shown, each of the first connectors 330 may further include an electrical enclosure 340, which electrically engages with the bus 320 to close a circuit and receive power. The electrical enclosure 340 can include three conductors corresponding to the three electrical conductors of the bus 320 (e.g., hot, neutral, and ground).

As further shown, each of the studs 350 may accommodate electrical connections with the tracks 310 and contain one or more of an integrated electrical bus 360 that may span longitudinally along portions of (or the length of) a corresponding one of the studs 350. The bus 360, like the electrical enclosure 340 and/or bus 320, can include insulating material and three electrical conductors for hot, neutral, and ground connections. In some embodiments, the second connectors 370 each include an electrical enclosure 380 that is adapted to electrically connect with the electrical enclosure 340 of the first connectors 330. The electrical enclosure 380 may include three conductors for hot, neutral, and ground, which electrically connect to bus 360.

To form the framing assembly 300, each of the studs 350 may be positioned vertically as shown with respect to one of the tracks 310 such that the second connectors 370 are oriented towards the first connectors 330. The electrical enclosure 340 of the first connectors 330 may then be engaged to the electrical enclosure 380 of the second connectors 370 simultaneously while the flange 376 of the second connectors 370 may be passed through the channel 334 such that at least a portion of the base 374 passes through the channel 334 so as to lock the engagement portion 378 in place along the edge portion 336 as indicated. As an alternative to a grounding connector, the bodies of bottom ones of the tracks 310 and the studs 350 can be used as conductors for ground.

As further shown in FIG. 8, the framing assembly 300 may include components from the framing assembly 200, such as the first connectors 230 and the second connectors 250. In this manner, the framing assembly 300 may include mechanical connections devoid of electrical connectivity provided by the first connectors 230 and the second connectors 250, and also electromechanical connections provided by the first connectors 330 and the second connectors 370. Any of these connectors may be deployed as desired for a given framing assembly application.

Referring to FIGS. 9A-9B, another embodiment of a framing assembly, designated framing assembly 400, is shown, having aspects similar to the framing assembly 300 and suitable for forming electromechanical connections. The framing assembly 400 may generally include using any number of a first connector 402 and a second connector 404 configured for snap-fit engagement with one another to interconnect a track 406 with a stud 412 which accommodates efficient mechanical and/or electrical interconnection between various components of the framing assembly 400, as further described herein. The framing assembly 400 may generally define a portion of a wall frame, a ceiling frame, or any other framing application requiring a framing structure. Further, while the first connector 402 and the second connector 404 are described herein generally as defining discrete components separate from each other and other components of the framing assembly 400, it is contemplated that in some embodiments the first connector 402 and/or the second connector 404 may be manufactured integrally with studs or tracks of the framing assembly 400 by way of a robotic assembly process or otherwise.

As shown, the track 406 may generally define a U-shaped configuration such that the track 406 defines a track channel 420 extending along a length of the track 406. In general, while the track 406 may define a U-shaped track (or U-shaped joist), in other embodiments, the track 406 may also take the form of a C-shaped track or other configuration. Similarly, the stud 412 may be U-shaped or C-shaped, and defines a stud channel 430 defined along a length of the stud 412.

In some embodiments, the stud 412 and track 406 are configured to accommodate formation of one or more of an electrical connection for the framing assembly 400. For example, the track 406 may include one or more of an integrated and optionally armored electrical bus 431 which may span longitudinal portions of (or the length of) the track 406. The bus 431 may contain three electrical conductors 432 for hot, neutral, and ground connections and may include insulating material along portions of the bus 431. In addition, the stud 412 may include one or more of an integrated and optionally armored electrical bus 434 which can span longitudinal portions of (or the length of) the stud 412. The bus 434 may include three electrical conductors 436 for hot, neutral, and ground connections and insulating material, and electrical conductors 436 may generally correspond to the electrical conductors 432 of the bus 431 of the track 406. Either of the bus 431 or the bus 434 may comprise a flexible metal conduit. In some embodiments, the bus 434 may terminate inside an electrical box 437 which may be pre-mounted to stud 412. This configuration of electrical components allows an installer to complete rough electrical wiring to the electrical box 437 simultaneously with the installation of the stud 412 in the framing assembly 400.

Figure 10A:
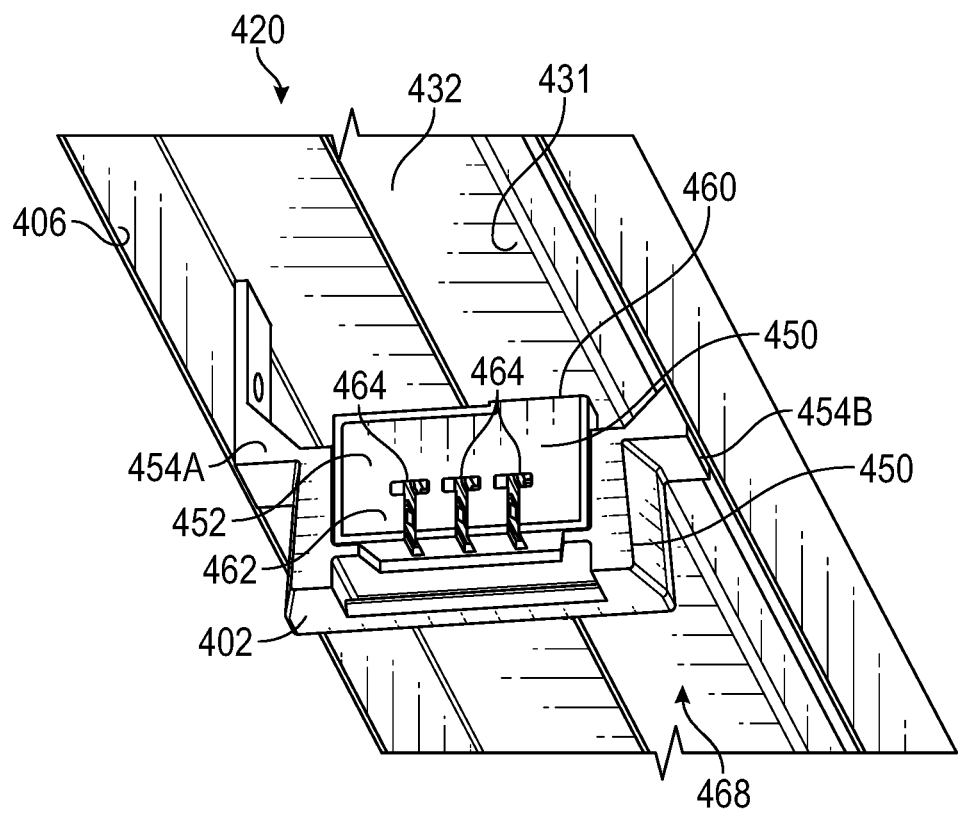
FIG. 10A is a perspective view of a portion of another embodiment of a first connector adapted with a first electrical enclosure of the framing assembly of FIGS. 9A-9B.
Figure 10B:
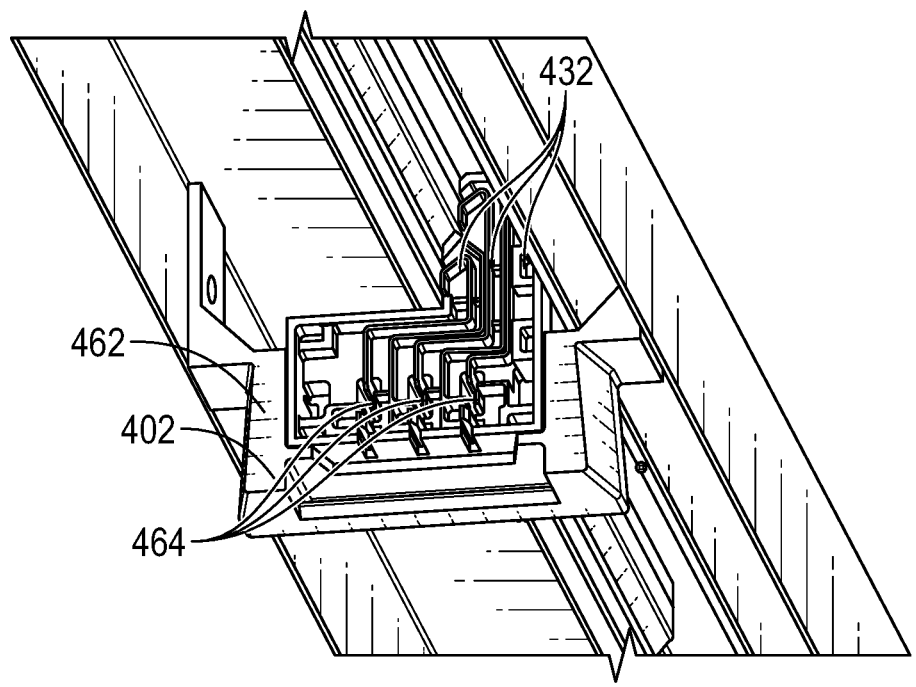
FIG. 10B is a perspective view of a portion of the first connector and the first electrical enclosure of FIG. 10A with a cover of the first electrical enclosure removed to reveal additional detail regarding the electrical characteristics of the first electrical enclosure and socket housing described herein.

Referring to FIG. 10A, at least a portion of the first connector 402 may be received within the track channel 420 in the manner indicated. The first connector 402 may generally include a body 450 defining a center portion 452 and defining a pair of laterally opposed arms designated arm 454A and arm 454B along opposite ends of the center portion 452 and adapted to be mounted within the track channel 420. In some embodiments, the arm 454A and arm 454B may be fastened to the track 406, or may be configured to maintain a fixed position along the track channel 420 by way of friction.

The first connector 402 further includes an electrical enclosure 460 which may define a socket housing 462 further defining a plurality of sockets 464 in electrical communication with the bus 431 to close a circuit and receive power. The plurality of sockets 464 of the electrical enclosure 460 may correspond to the three electrical conductors 432 of the bus 431 (e.g., hot, neutral, and ground) of the track 406. As further indicated in FIG. 10A (and also indicated in FIG. 13A), the body 450 of the first connector 402 further defines an edge portion 468 along an opposite side of the body 450 relative to the socket housing 462.

Figure 11:
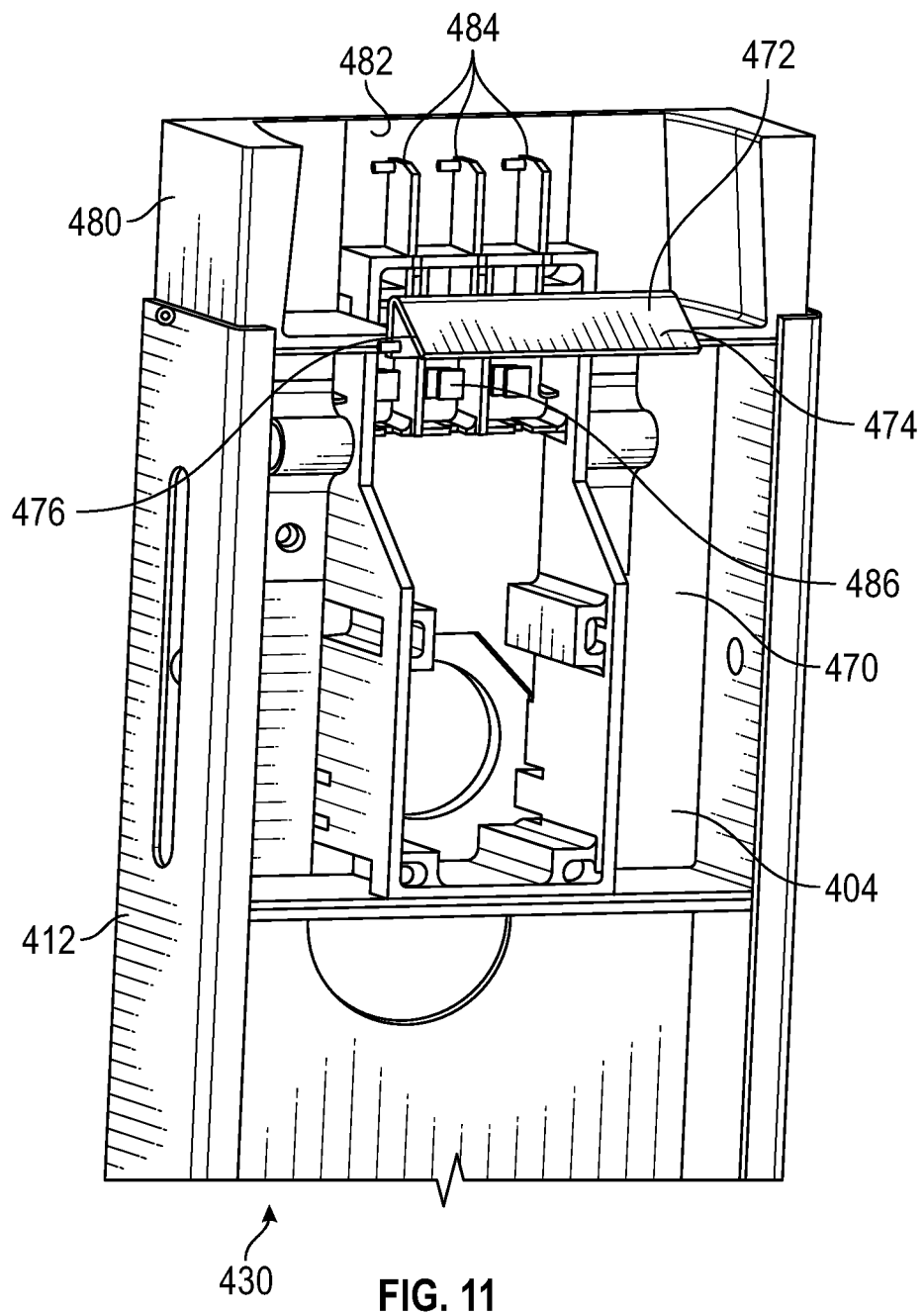
FIG. 11 is a perspective view of a portion of another embodiment of a second connector with a second electrical enclosure of the framing assembly of FIGS. 9A-9B and configured for forming electromechanical connection with the first connector and first electrical enclosure of FIGS. 10A-10B.

Referring to FIG. 11, the second connector 404 may be positioned along the stud 412, such as the ends of the stud 412, and may be telescopically received within the stud channel 430. The second connector 404 may generally include a body 470 adapted for positioning along the stud channel 430. In some embodiments, the body 470 may be fastened to the stud 412 in some predetermined location, or may be configured to maintain a fixed position relative to the stud 412 by way of friction. As indicated, the second connector 404 further includes a retention clip 472 extending from the body 470. In some embodiments, the retention clip 472 includes a flange 474 defining an engagement surface 476 adapted to abut the edge portion 468 of the first connector 402 as further described herein.

Figure 12:
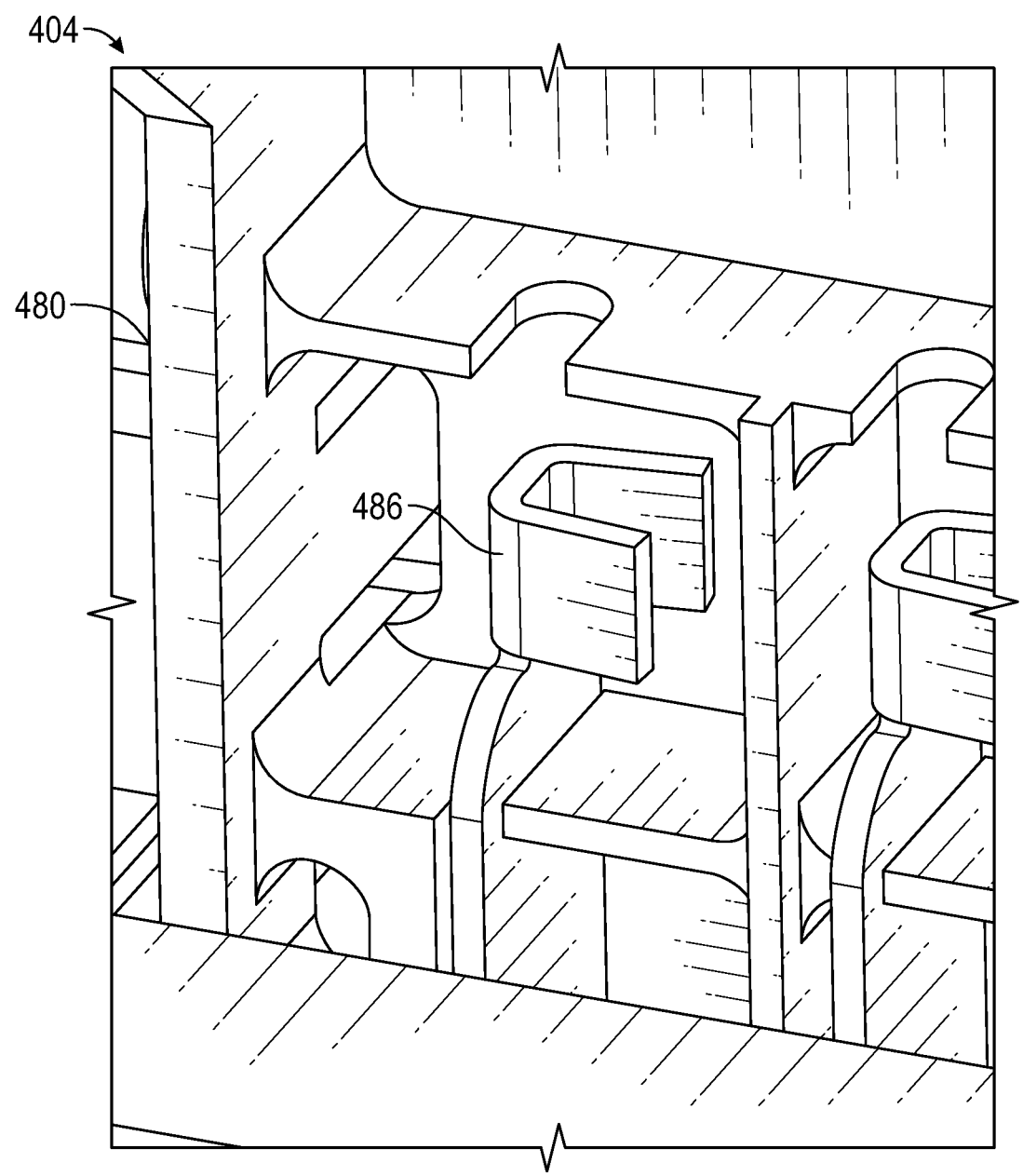
FIG. 12 is a detail view showing of aspects of the second connector of FIG. 11.

The second connector 404 further includes an electrical enclosure 480 which may define a housing 482 further defining a plurality of electrical contacts 484 in electrical communication with the conductors 436 extending within the bus 434 (not shown) to close a circuit and receive power. In other words, the plurality of electrical contacts 484 of the electrical enclosure 480 may correspond to the three electrical conductors 436 of the bus 434 (e.g., hot, neutral, and ground) extending along the stud 412, and also to the plurality of sockets 464 of the first connector 402. As further indicated in FIG. 12, the electrical enclosure 480 may further include crimp fittings 486 to accept electrical wiring or other conductors that may traverse along the stud 412. The crimp fittings 486 may, e.g., accept the conductors 436 extending within the bus 434 extending along the stud 412.

Figure 13A:
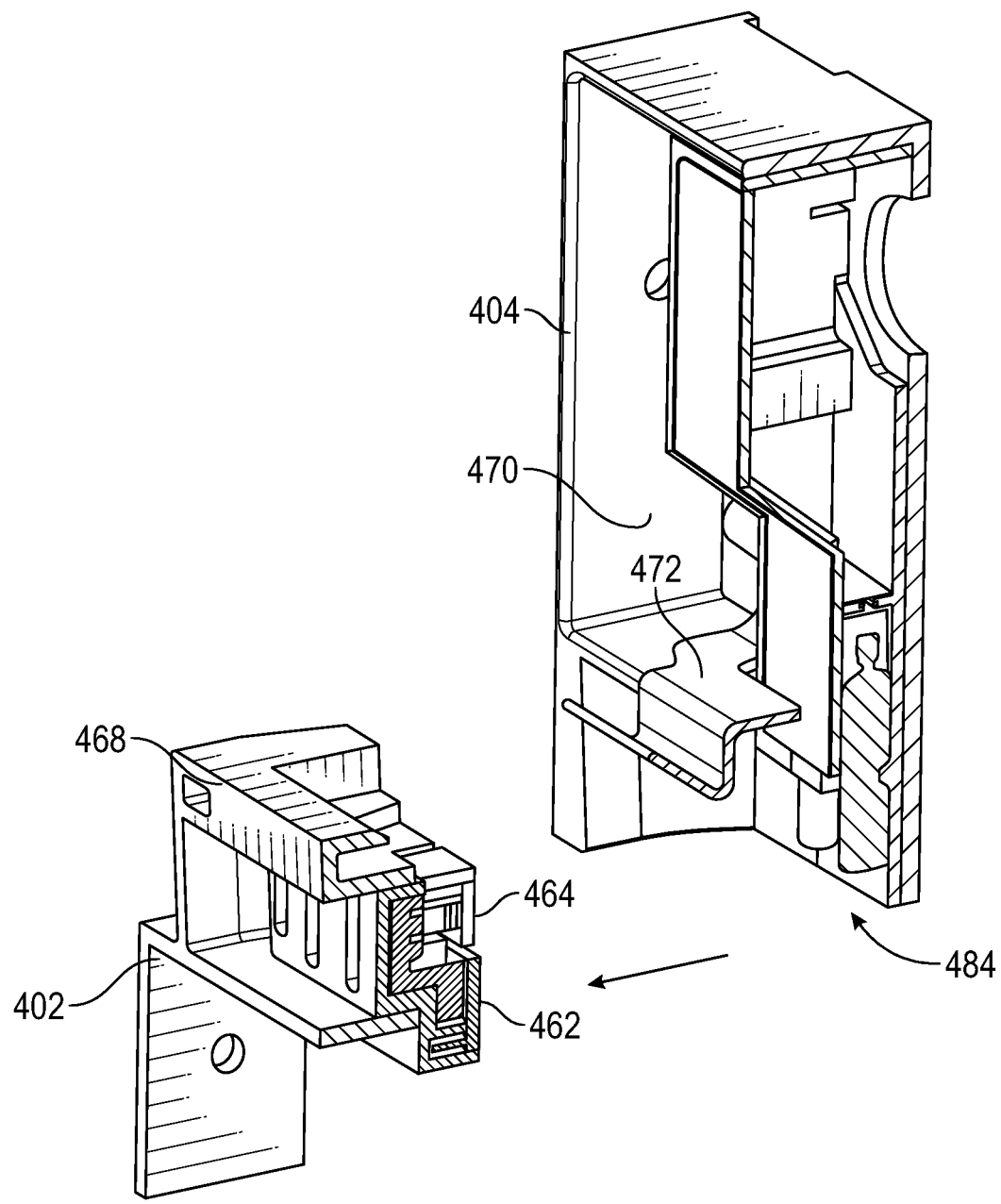
FIGS. 13A-13C are perspective views with portions cut-away that illustrate different phases of engaging the first connector and first electrical enclosure of FIGS. 10A-10B with the second connector and second electrical enclosure of FIG. 11.
Figure 13B:
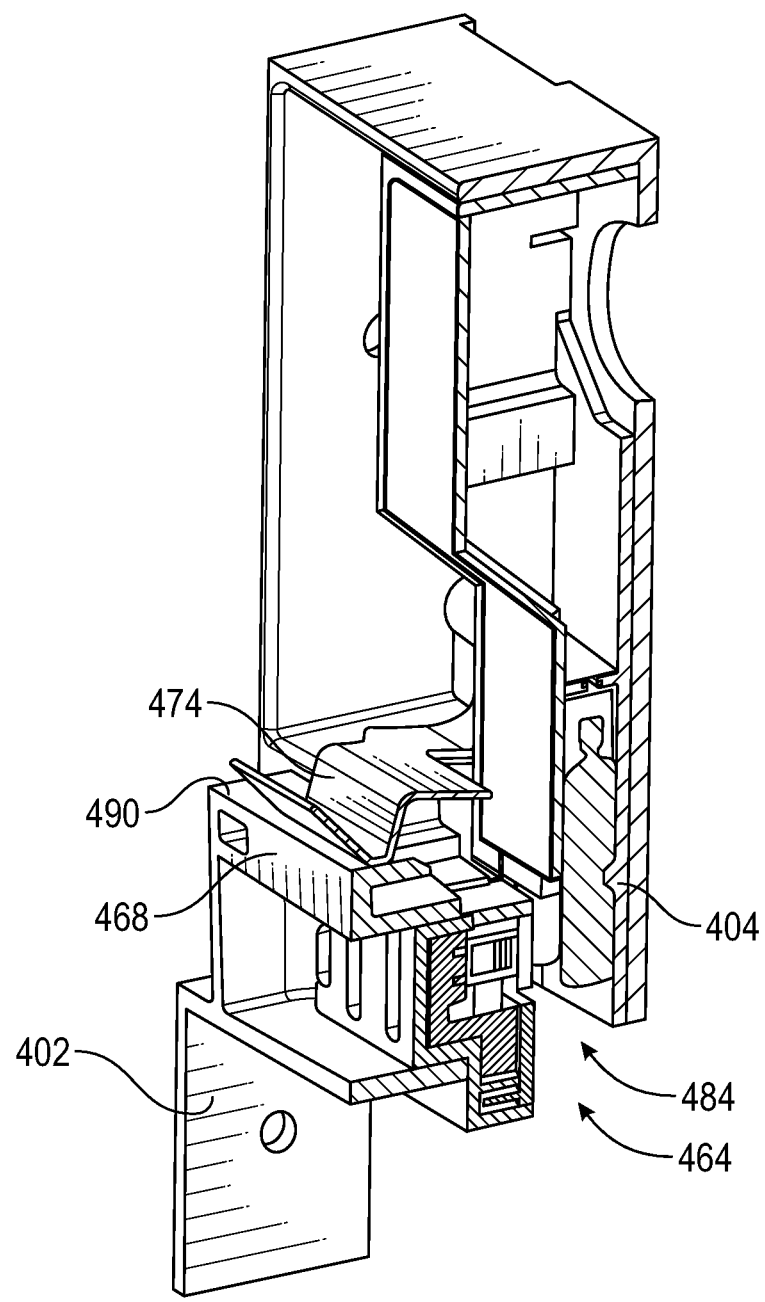

Referring to FIGS. 13A-13B, the first connector 402 may be engaged to the second connector 404 to electromechanically interconnect the track 406 with the stud 412. In FIG. 13A, the socket housing 462 of the first connector 402 including the plurality of sockets 464 may be oriented towards the plurality of electrical contacts 484 and the retention clip 472 of the second connector 404. As indicated in FIGS. 13B-13C, the first connector 402 and the second connector 404 may then be brought together in the manner indicated such that the plurality of electrical contacts 484 engage or plug to within the plurality of sockets 464 to form an electrical connection between the bus 431 of the track 406 and the bus 434 of the stud 412.

Figure 13C:
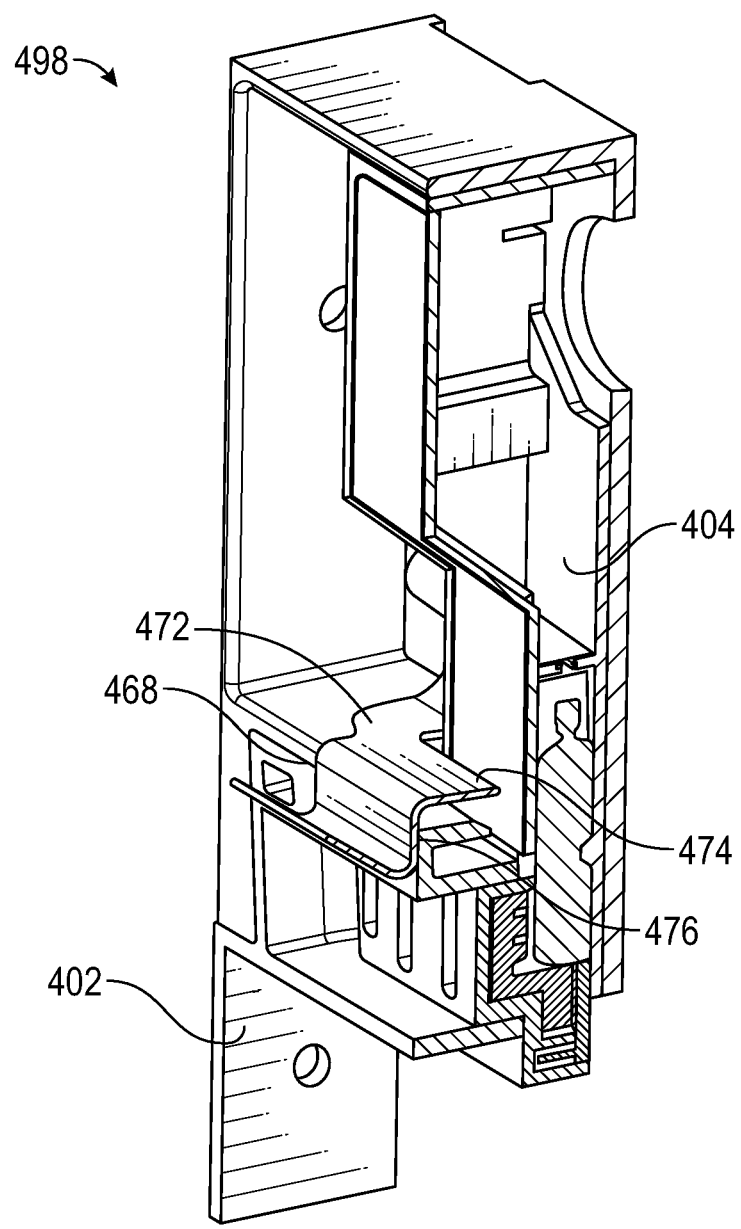

Simultaneously, the flange 474 may temporarily deflect along a deflecting surface 490 of the first connector 402 and then return to its original position in FIG. 13C such that the engagement surface 476 of the flange 474 snaps to and abuts the edge portion 468 of the first connector 402 as shown. In this manner, the retention clip 472 of the second connector 404 may generally latch onto the edge portion 468 be locked or fixed in place relative to the first connector 402 such that the second connector 404 141 is at least temporarily locked in the x, y, and z-directions. When connected as described, the first connector 402 and the second connector 404 form a locked configuration 498.

Similar to any of the foregoing embodiments, it should be appreciated that various modifications and variations to the framing assembly 400 are contemplated. For example, it should be appreciated that aspects of the first connector 402 may be swapped with aspects of the second connector 404, such that at that least some features of the first connector 402 and second connector 404 may be interchangeable in design; e.g., the flange 474 may be moved to the first connector 402. Further, the first connector 402 may be manufactured integrally with the track 406 and the second connector 404 may be manufactured integrally with the stud 412, or each of the aforementioned may be formed independently and later assembled. Different embodiments are further contemplated to accommodate any number of related electrical features. For example, alternative embodiments of the bus 320, bus 360, bus 431, and bus 434 may include one or more electrical conductors, or more than three electrical conductors (e.g. for 240 V split phase electrical service, such that each bus may include an extra hot conductor throughout extending through the bus for a total of four conductors).

Figure 14:
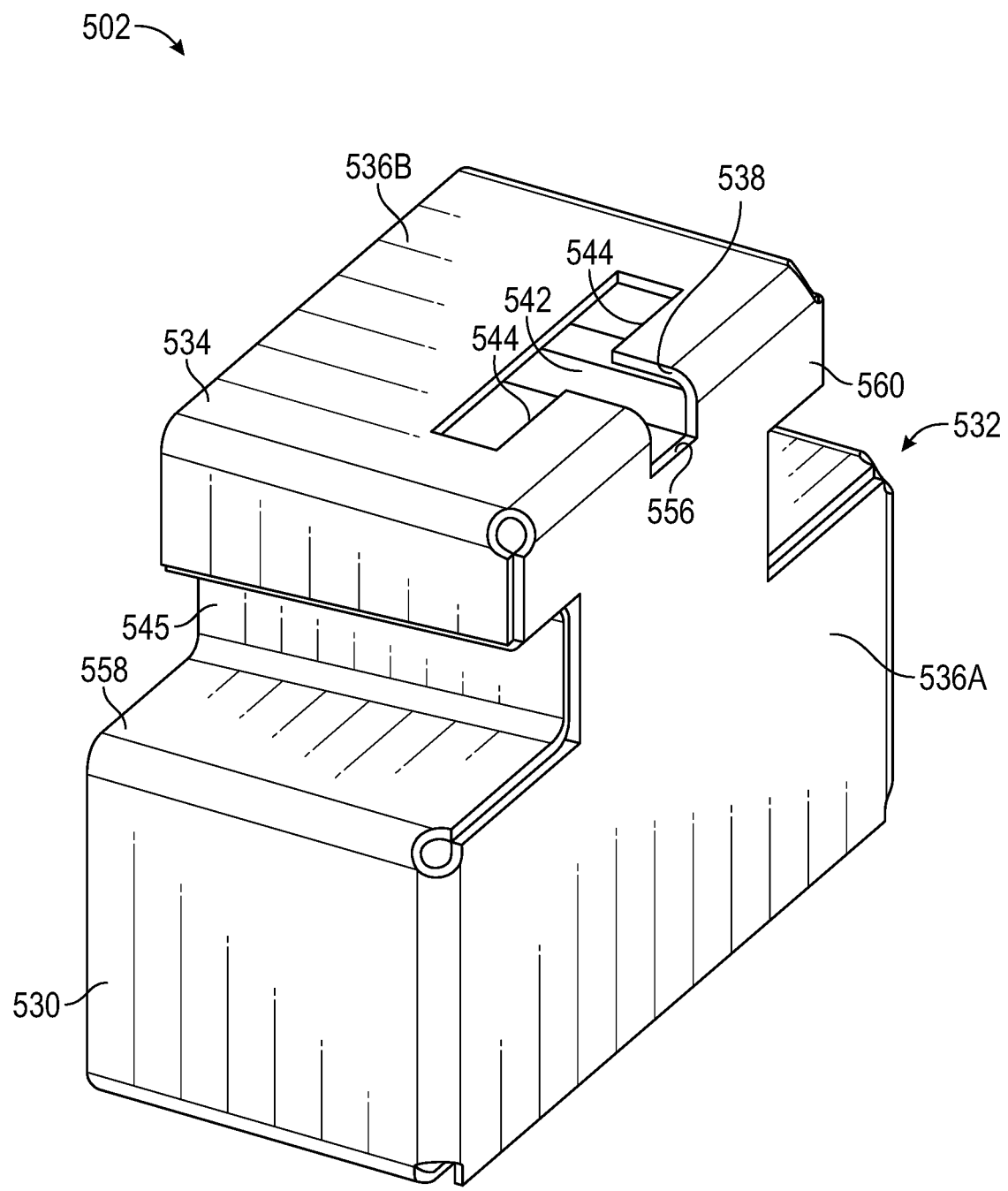
FIG. 14 is a perspective view of another embodiment of a first connector for use with any of the framing assembly embodiments described herein.

Referring to FIG. 14, another embodiment of first connector 502 for possible deployment with any of the framing assemblies described herein is shown. As indicated, the first connector 502 generally comprises a base 530, and a first connector body 532 defining a mounting portion 534 extending over the base 530. The base 530 generally defines a three-dimensional (3D) rectangular shape configuration or substrate which may be configured in size and dimensions suitable for insertion within the track channel 120 or the stud channel 130 of the framing assembly 100 or other framing assembly embodiments.

As shown, the mounting portion 534 of the first connector body 532 defines a first side 536A and a second side 536B opposite the first side 536A. The mounting portion 534 generally includes a deflection portion 538 defined proximate to the first side 536A, a retention cavity 542 defined between the first side 536A and the second side 536B of the mounting portion 534, and an edge portion 544 abutting the deflection portion 538. In some embodiments, the mounting portion 534 may be in communication with the base 530 via a middle portion 545. Further, the mounting portion 534 may define an access recess 556 along the first side 536A in communication with the retention cavity 542. The access recess 556 accommodates disengagement of the first connector 502 from any one of the second connectors after initial engagement (not shown).

In some embodiments, along opposite lateral sides of the deflecting portion 538, the mounting portion 534 may further define a first chamfered arm 558 and a second chamfered arm 560 positioned in parallel relative to one another over opposite lateral ends of the base 530. In this manner, the mounting portion 534 may generally define a T-shape configuration when viewed directly from the first side 536A. As further described herein, structural aspects of any of the second connectors 104 may be configured to receive or otherwise correspond to this embodiment of the mounting portion 134 to facilitate engagement. For example, the first chamfered arm 558 and a second chamfered arm 560 may be configured to be received within the mounting recess 166 of the second connector 104A.

Figure 15:
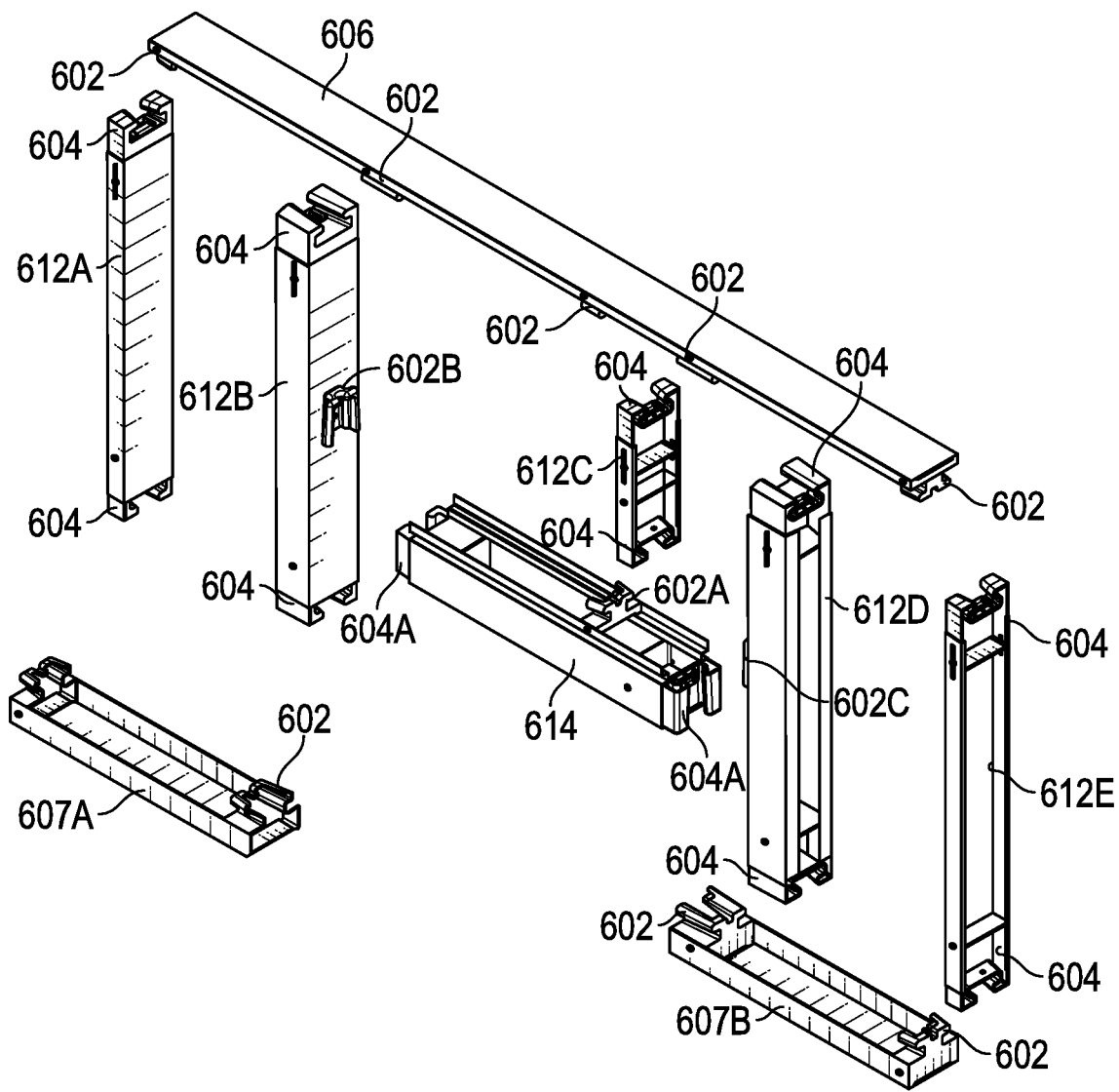
FIG. 15 is an exploded perspective view of another embodiment of a framing assembly.

Referring to FIG. 15, a framing assembly 600 is shown similar to the framing assembly 100 of FIGS. 1A-1B. In this embodiment, the framing assembly 600 may generally include a plurality of first connectors 602, and a plurality of second connectors 604 configured to engage with the first connectors 602 to interconnect, e.g., a top track 606, a first bottom track 607A, a second bottom track 607B, a plurality of studs 612 designated studs 612A-612E, and a header 614, as further described herein. The framing assembly 600 components may comprise a rigid or semi-rigid material, such as steel, any number or type of metal, plastic, or the like.

In the example of the framing assembly 600, the studs 612A and 612B may be positioned between the top track 606 and the bottom track 607A as shown. In addition, the studs 612D and 612E may be positioned between the top track 606 and the bottom track 607B. As further shown, the header 614 may be positioned between the stud 612B and the stud 612D. The stud 612C, which may have a length less than the other studs 612, may be positioned between the top track 606 and the header 614. The header 614 (or lintel) may be used to span across an opening for a window or door, or any other predefined opening along the framing assembly 600. The header 614 may generally take the form of an elongated connection member, similar to a U-shaped stud or track.

In general, the aforementioned components of the framing assembly 600 may be interconnected by engaging the first connectors 602 to the second connectors 604 in closest proximity to the first connectors 602. In some embodiments, the first connectors 602 and the second connectors 604 may include at least some of the features of the first connectors 102 and the second connectors 104. Accordingly, it is contemplated that the first connectors 602 are configured for snap-lock engagement with the second connectors 604 consistent with the snap-lock or locking mechanism functionality illustrated in FIGS. 5A-5C and 6A-6E and described herein. As shown for example, first connector 602A engages with a second connector 604 (mounted along stud 612C), first connector 602B (mounted along stud 612B as shown) engages with a second connector 604A (mounted along a free end of header 614), and first connector 602C (mounted along stud 612D as shown) engages with a second connector 604A (mounted along another free end of header 614).

Figure 16:
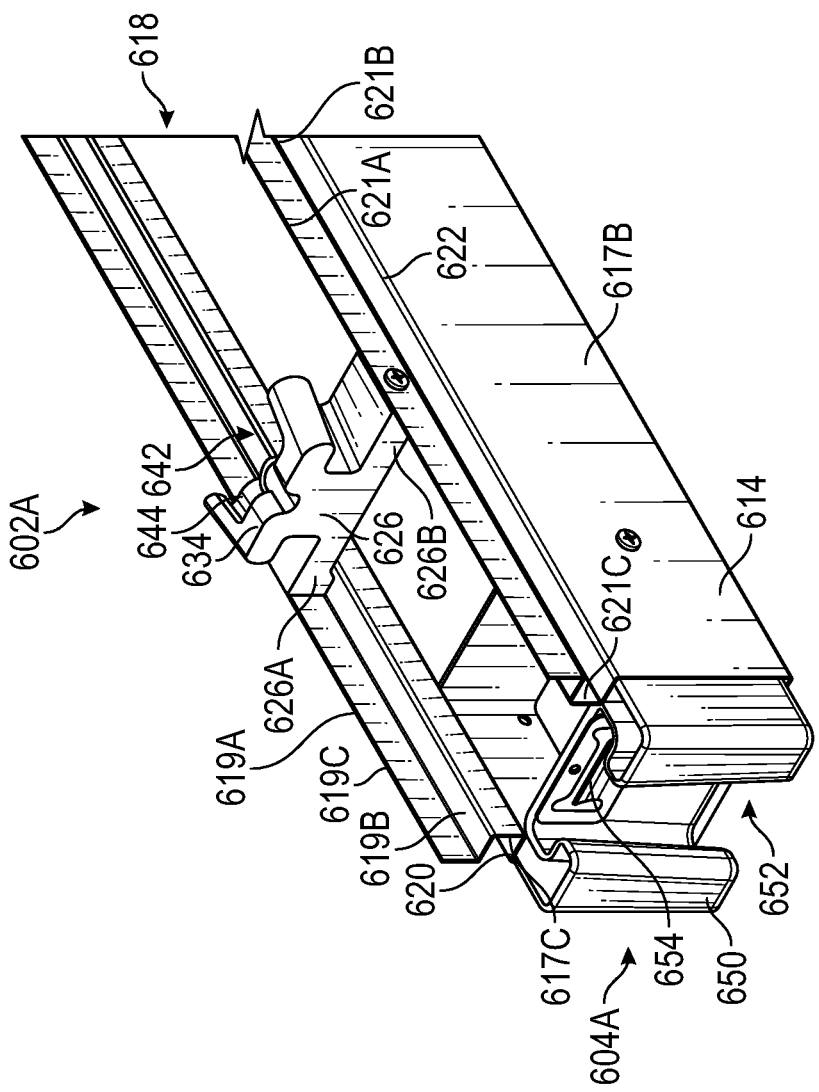
FIG. 16 is a perspective view of a portion of the framing assembly embodiment of FIG. 15.

Referring to FIG. 16, further detail regarding the header 614 of the framing assembly 600 and possible methods of interconnecting the header 614 with other components of the framing assembly 600 is shown. As indicated, the header 614 may generally define a body 616 including a first flange 617A and a second flange 617B defining a header channel 618. The first flange 617A and a second flange 617B may collectively provide a cross-sectional shape of the header 614 suitable for connection with any number of the first connector 602A at predetermined cripple stud locations. For example, the first flange 617A may define a first side wall 619A, a second side wall 619B, and a third sidewall 619C extending from a return 620. Similarly, the second flange 617B may define a first side wall 621A, a second side wall 621B, and a third sidewall 621C extending from a return 622.

A first connector 602A of the first connectors 602 may be mounted along the header 614 over the header channel 618. In particular, the first connector 602A defines a base 624 including a first leg 626A along one lateral side of the base 624 and a second leg 626B along another lateral side of the base 624 opposite the first leg 626A. As indicated, the first leg 626A of the first connector 602A may be aligned in abutting fashion relative to the interior portions of the 617A. More specifically, the first leg 626A may at least partially rest along the second side wall 619B, and abut the first side wall 619A. In addition, the second leg 626B may at least partially rest along the second side wall 621B, and abut the first side wall 621A. The first connector 602A may further be anchored or fastened to the header 614 in the position shown.

With exception to the modified base 624, the first connector 602A may generally take the form of the first connector 102A, and may further include a mounting portion 632, a deflecting portion 634, a retention cavity 642, and an edge portion 644. The first connector is configured to connect with at least one of the second connectors 604 to interconnect other components of the framing assembly 600 to the header 614. For example, the header 614 may be interconnected to the stud 612C shown in FIG. 15.

As further indicated, the second connectors 604 may generally define elongated versions of the second connectors 104. For example, the second connector 604A shown may include a body 650 with a portion of the body 650 (not shown) telescopically received within the header channel 618. The body 650 may include a mounting recess 652 extending in concave fashion to within a predetermined portion of the body 650, and the mounting recess 652 is configured to receive the mounting portion 632 of the first connectors 602. Like the second connectors 104, the second connector 604A may further include a retention clip 654 for engagement along a deflection portion and an edge portion of a corresponding first connector 602 (not shown).

It is believed that the present disclosure and many of its attendant advantages should be understood by the foregoing description, and it should be apparent that various changes may be made in the form, construction, and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it should be understood that these embodiments are illustrative and that the scope of the disclosure is not limited to such embodiments. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A framing assembly, comprising:
   a first connector, the first connector including a deflection portion defining a deflection surface and an edge portion in communication with the deflection portion; and
   a second connector including a retention clip defining a base portion and a contact end extending from the base portion,
   wherein the second connector is configured to engage with the first connector to form a locked configuration and interconnect framing components with the contact end abutting the edge portion of the first connector and restricting movement of the second connector relative to the first connector, and
   wherein in the locked configuration the contact end of the second connector is oriented towards the edge portion.

2. The framing assembly of claim 1, wherein the edge portion defines a pair of edges in parallel alignment relative to the deflection portion.

3. The framing assembly of claim 1, wherein the deflection surface extends at least partially between a first side and a second side of the first connector.

4. The framing assembly of claim 1, wherein the first connector and the second connector form the locked configuration by temporary deflection of the contact end of the retention clip against the deflection surface of the first connector.

5. The framing assembly of claim 4, wherein in the locked configuration the contact end completely traverses the deflection portion from a first section to a second section of the deflecting portion, such that the contact end clears the deflection portion enabling the retention clip to return to its original configuration from a temporary deflection.

6. The framing assembly of claim 1, wherein to assume the locked configuration a top side of the first connector is aligned with the retention clip of the second connector.

7. A framing assembly, comprising:
   a first connector, the first connector including a deflection portion defining a deflection surface and an edge portion in communication with the deflection portion; and
   a second connector including a retention clip defining a base portion and a contact end extending from the base portion,
   wherein the second connector is configured to engage with the first connector to form a locked configuration and interconnect framing components with the contact end abutting the edge portion of the first connector and restricting movement of the second connector relative to the first connector, and
   wherein to assume the locked configuration, the contact end of the second connector is oriented away from the first connector.

8. The framing assembly of claim 7, wherein to assume the locked configuration, the edge portion of the first connector is oriented away from the second connector.

9. The framing assembly of claim 8, wherein to assume the locked configuration, the second connector slides across the first connector in a first direction.

10. The framing assembly of claim 9, wherein in the locked configuration the contact end contacts the edge portion and restricts movement of the second connector from the first connector in a second direction opposite the first direction.

11. The framing assembly of claim 1, further comprising:
    wherein the framing components include:
      a first framing component, the first connector positioned along the first framing component; and
      a second framing component extending orthogonally from the first framing component, the second connector positioned along the second framing component, and
    wherein the first connector and the second connector interconnect the first framing component with the second framing component.

12. A framing assembly, comprising:
    a first connector, the first connector including a deflection portion defining a deflection surface and an edge portion in communication with the deflection portion; and
    a second connector including a retention clip defining a base portion and a contact end extending from the base portion,
    wherein the second connector is configured to engage with the first connector to form a locked configuration and interconnect framing components with the contact end abutting the edge portion of the first connector and restricting movement of the second connector relative to the first connector,
    wherein the framing components include:
      a first framing component, the first connector positioned along the first framing component; and
      a second framing component extending orthogonally from the first framing component, the second connector positioned along the second framing component, and
    wherein the first connector and the second connector interconnect the first framing component with the second framing component, and
    wherein the first connector includes a first electrical enclosure, and the second connector includes a second electrical enclosure that electrically connects with the first enclosure to form an electrical circuit along the first framing component and the second framing component.

13. A framing assembly, comprising:
    a first connector, the first connector including a deflection portion defining a deflection surface and an edge portion in communication with the deflection portion; and
    a second connector including a retention clip defining a base portion and a contact end extending from the base portion,
    wherein the second connector is configured to engage with the first connector to form a locked configuration and interconnect framing components with the contact end abutting the edge portion of the first connector and restricting movement of the second connector relative to the first connector, wherein the framing components include:
a first framing component, the first connector positioned along the first framing component; and
a second framing component extending orthogonally from the first framing component, the second connector positioned along the second framing component, and wherein the first connector and the second connector interconnect the first framing component with the second framing component, and wherein the first connector slides freely within the first framing component to accommodate deflection.

14. The framing assembly of claim 13, wherein the first connector or the second connector is manufactured integrally with a framing component.

15. A framing assembly, comprising:
a plurality of connectors that engage to interconnect framing components, including:
a first connector, the first connector including a flange; and
a second connector that engages with the first connector, the second connector including a including an edge portion,
wherein the second connector is engaged to the first connector such that the flange abuts the edge portion of the second connector restricting movement of the second connector relative to the first connector, and
wherein the flange temporarily deflects and returns to its original configuration to form a locking configuration with the edge portion.

16. A framing assembly, comprising:
a framing component;
a first connector positioned along a first side of the framing component, the first connector defining a first profile configuration such that the first connector includes an edge portion;
a second connector positioned along a second side of the framing component adjacent the first side, the second connector defining a second profile configuration such that the second connector includes a flange;
a third connector that connects to the first connector, the third connector defining the second profile configuration such that the third connector includes a flange that engages with the edge portion of the first connector; and
a fourth connector that connects to the second connector, the fourth connector defining the first profile configuration such that the fourth connector includes an edge portion that engages with the flange of the second connector.

17. The framing assembly of claim 16, wherein the framing component is a header for an opening, and the fourth connector is mounted to a stud such that the fourth connector connects with the second connector to interconnect the stud with the header.

18. The framing assembly of claim 1, further comprising:
wherein the framing components include:
a first framing component, the first connector positioned along the first framing component; and
a second framing component extending orthogonally from the first framing component, the second connector positioned along the second framing component, and
wherein the first connector and the second connector interconnect the first framing component with the second framing component.

19. The framing assembly of claim 18, wherein the first connector includes a first electrical enclosure, and the second connector includes a second electrical enclosure that electrically connects with the first enclosure to form an electrical circuit along the first framing component and the second framing component.

20. The framing assembly of claim 19, wherein the first connector slides freely within the first framing component to accommodate deflection.

21. The framing assembly of claim 15, wherein the first connector includes a first electrical enclosure, and the second connector includes a second electrical enclosure that electrically connects with the first enclosure to form an electrical circuit.

22. A method of making a framing assembly, comprising:
forming a plurality of connectors that engage to interconnect framing components, including:
forming a first connector, the first connector including a flange; and
forming a second connector adapted to engage with the first connector, the second connector including a including an edge portion,
wherein the second connector is adapted to engage to the first connector such that the flange abuts the edge portion of the second connector restricting movement of the second connector relative to the first connector, and
wherein the flange is adapted to temporarily deflect and return to its original configuration to form a locking configuration with the edge portion.

* * * * *